United States Patent
Frenne et al.

(10) Patent No.: US 10,348,541 B2
(45) Date of Patent: Jul. 9, 2019

(54) SENDING AND DETECTING SYNCHRONIZATION SIGNALS AND AN ASSOCIATED INFORMATION MESSAGE

(71) Applicant: Telefonaktiebolaget LM Ericsson (publ), Stockholm (SE)

(72) Inventors: Mattias Frenne, Uppsala (SE); Johan Furuskog, Stockholm (SE); Dirk Gerstenberger, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 85 days.

(21) Appl. No.: 15/035,885

(22) PCT Filed: Oct. 22, 2014

(86) PCT No.: PCT/SE2014/051248
§ 371 (c)(1),
(2) Date: May 11, 2016

(87) PCT Pub. No.: WO2015/080649
PCT Pub. Date: Jun. 4, 2015

(65) Prior Publication Data
US 2016/0277225 A1    Sep. 22, 2016

Related U.S. Application Data

(60) Provisional application No. 61/909,731, filed on Nov. 27, 2013.

(51) Int. Cl.
| | |
|---|---|
| H04L 5/00 | (2006.01) |
| H04L 27/26 | (2006.01) |
| H04W 56/00 | (2009.01) |

(52) U.S. Cl.
CPC ......... *H04L 27/261* (2013.01); *H04L 5/0048* (2013.01); *H04L 5/0053* (2013.01);
(Continued)

(58) Field of Classification Search
None
See application file for complete search history.

(56) References Cited

U.S. PATENT DOCUMENTS

| | | | |
|---|---|---|---|
| 9,596,667 B2* | 3/2017 | Awad | H04L 5/001 |
| 2008/0137776 A1* | 6/2008 | Keel | H04B 1/70735 |
| | | | 375/316 |

(Continued)

FOREIGN PATENT DOCUMENTS

| | | | |
|---|---|---|---|
| EP | 2400805 A2 | 12/2011 | |
| WO | 2010054252 A1 | 5/2010 | |
| WO | WO-2015042858 A1 * | 4/2015 | ............ H04W 48/12 |

*Primary Examiner* — Noel R Beharry
*Assistant Examiner* — Rodrick Mak
(74) *Attorney, Agent, or Firm* — Sage Patent Group

(57) ABSTRACT

Embodiments herein relate to methods and apparatuses. A method performed by a network node (210) for sending to a wireless device (250) a first synchronization signal and an associated information message, for synchronization of the wireless device (250) with the network node (210) is provided. The network node (210) sends the first synchronization signal in OFDM symbols within a subframe, at least once in a time and frequency position in every one of the N OFDM symbols. For each sending of the first synchronization signal, the network node (210) sends an associated information message at a pre-defined time and frequency position in an OFDM symbol. The pre-defined time and frequency position is relative to the time and frequency position of the first synchronization signal. Embodiments herein also relate to a wireless device and method therein.

20 Claims, 12 Drawing Sheets

(52) U.S. Cl.
CPC ........ *H04L 5/0092* (2013.01); *H04L 27/2655* (2013.01); *H04L 27/2656* (2013.01); *H04L 27/2675* (2013.01); *H04W 56/0015* (2013.01)

(56) References Cited

U.S. PATENT DOCUMENTS

| | | | |
|---|---|---|---|
| 2010/0034163 A1* | 2/2010 | Damnjanovic ... | H04W 72/0453 370/329 |
| 2010/0279707 A1* | 11/2010 | Fischer ................ | G01S 5/021 455/456.1 |
| 2011/0110315 A1* | 5/2011 | Chen ...................... | H04L 1/00 370/329 |
| 2012/0122495 A1* | 5/2012 | Weng ................ | H04W 68/025 455/458 |
| 2012/0307726 A1 | 12/2012 | Pi et al. | |
| 2013/0064239 A1 | 3/2013 | Yu et al. | |
| 2013/0089065 A1 | 4/2013 | Koorapaty et al. | |
| 2013/0235851 A1 | 9/2013 | Abu-Surra et al. | |
| 2015/0318908 A1* | 11/2015 | Ko .......................... | H04L 1/00 375/267 |
| 2016/0205692 A1* | 7/2016 | Zhang ................ | H04W 48/12 370/329 |
| 2016/0277225 A1* | 9/2016 | Frenne .............. | H04W 56/0015 |
| 2016/0308637 A1* | 10/2016 | Frenne ................ | H04J 11/0069 |
| 2018/0069589 A1* | 3/2018 | Liu ........................ | H04B 1/005 |

* cited by examiner

SENDING AND DETECTING SYNCHRONIZATION SIGNALS AND AN ASSOCIATED INFORMATION MESSAGE

TECHNICAL FIELD

The present disclosure relates generally to a network node and methods therein for sending, to a wireless device, a first synchronization signal and an associated information message, for synchronization of the wireless device with the network node. The present disclosure also relates generally to the wireless device and methods therein for detecting the first synchronization signal and the associated information message.

BACKGROUND

Communication devices such as terminals are also known as e.g. User Equipments (UE), wireless devices, mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In $3^{rd}$ Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The development of the $5^{th}$ Generation (5G) access technology and air interference is still very premature but there have been some early publications on potential technology candidates. A candidate on a 5G air interface is to scale the current LTE, which is limited to 20 Mega Hertz (MHz) bandwidth, N times in bandwidth with 1/N times shorter time duration, here abbreviated as LTE-Nx. A typical value may be N=5 so that the carrier has 100 MHz bandwidth and 0.1 millisecond slot lengths. With this scaled approach, many functions in LTE can be re-used in LTE-Nx, which would simplify standardization effort and allow for a reuse of technology components.

The carrier frequency for an anticipated 5G system could be much higher than current 3G and $4^{th}$ Generation (4G) systems, values in the range 10-80 Giga Hertz (GHz) have been discussed. At these high frequencies, an array antenna may be used to achieve coverage through beamforming gain, such as that depicted in FIG. 1. FIG. 1 depicts a 5G system example with three Transmission Points (TPs), Transmission Point 1 (TP1), Transmission Point 2 (TP2), Transmission Point 3 (TP3) and a UE. Each TP utilizes beamforming for transmission. Since the wavelength is less than 3 centimeters (cm), an array antenna with a large number of antenna elements may be fit into an antenna enclosure with a size comparable to 3G and 4G base station antennas of today. To achieve a reasonable link budget, a typical example of a total antenna array size is comparable to an A4 sheet of paper.

The beams are typically highly directive and give beamforming gains of 20 decibels (dB) or more since so many antenna elements participate in forming a beam. This means that each beam is relatively narrow in horizontal and/or azimuth angle, a Half Power Beam Width (HPBW) of 5 degrees is not uncommon. Hence, a sector of a cell may need to be covered with a large number of potential beams. Beamforming can be seen as when a signal is transmitted in such a narrow HPBW that it is intended for a single wireless device or a group of wireless devices in a similar geographical position. This may be seen in contrast to other beam shaping techniques, such as cell shaping, where the coverage of a cell is dynamically adjusted to follow the geographical positions of a group of users in the cell. Although beamforming and cell shaping use similar techniques, i.e., transmitting a signal over multiple antenna elements and applying individual complex weights to these antenna elements, the notion of beamforming and beams in the embodiments described herein relates to the narrow HPBW basically intended for a single wireless device or terminal position.

In some embodiments herein, a system with multiple transmission nodes is considered, where each node has an array antenna capable of generating many beams with small HPBW. These nodes may then for instance use one or multiple LTE-Nx carriers, so that a total transmission bandwidth of multiples of hundreds of MHz can be achieved leading to downlink peak user throughputs reaching as much as 10 Gigabytes (Gbit/s) or more.

In LTE access procedures, a UE may first search for a cell using a cell search procedure, to detect an LTE cell and decode information required to register to the cell. There may also be a need to identify new cells, when a UE is already connected to a cell to find neighbouring cells. In this case, the UE may report the detected neighbouring cell identity and some measurements, to its serving cell, as to prepare for a handover. In order to support cell search, a unique Primary Synchronization Signal (PSS) and Secondary Synchronization Signal (SSS) may be transmitted from each eNB. The synchronizations signals are used for frequency synchronization and time synchronization. That is, to align a receiver of wireless device, e.g., the UE, to the signals transmitted by a network node, e.g., the eNB. The PSS comprises information that allows the wireless device in LTE to detect the 5 ms timing of the cell, and the cell identity within the cell-identity group. The SSS allows the wireless device in LTE to obtain frame timing and the cell-identity group. The PSS may be constructed from a Zadoff-Chu sequence of length 63, mapped to the center 64 subcarriers where the middle, so called DC subcarrier is unused. There may be three PSS in LTE, corresponding to three physical layer identities. The SSS may be constructed from two interleaved M-sequences of length 31 respectively, and by applying different cyclic shifts of each of the two M-sequences, different SSS may be obtained. In total, there may be 168 valid combinations of the two M-sequences, representing the cell identity groups. Combining the PSS and SSS, there may be thus in total 504 physical cell identities in LTE.

When a cell has been found, the UE may proceed with further steps to be associated with this cell, which may then be known as the serving cell for this UE. After the cell is found, the UE may read System Information (SI) in e.g., the Physical Broadcast CHannel (PBCH), known as the Master Information Block (MIB), which is found in a time frequency position relative to the PSS and SSS locations. The SI comprises all the information needed by a wireless device to access the network using a random access procedure. After the MIB is detected, the System Frame Number (SFN) and the system bandwidth are known. The UE may let the network know about its presence by transmitting a message in the Physical Random Access CHannel (PRACH).

When a cell has multiple antennas, each antenna may transmit an individual encoded message to the wireless device or UE, thereby multiplying the capacity by the number of layers transmitted. This is well known as MIMO transmission, and the number of layers transmitted is known as the rank of the transmission. Beamforming, traditionally, is equivalent to a rank 1 transmission, where only one encoded message is transmitted, but simultaneously from all antennas with individually set complex beamforming weights per antenna. Hence, in beamforming, only a single layer of Physical Downlink Shared CHannel (PDSCH) or Evolved Physical Downlink Control CHannel (EPDCCH) is transmitted in a single beam. This beamforming transmission is also possible in LTE, so after a UE has been associated with a cell, a set of N=1, 2, 4 or 8 Channel State Information Reference Signals (CSI-RS) may be configured for measurement reference at the UE, so that the UE may report a preferred rank 1 N×1 precoding vector containing the complex beamforming weights based on the CSI-RS measurement. The precoding vector may be selected from a codebook of rank 1 precoding vectors. In Rel-8, there are 16 rank 1 precoding vectors defined, and in Rel-12 a new codebook was designed with 256 rank 1 precoding vectors.

A "beam" may thus be the result of a certain precoding vector applied for one layer of transmitted signal across the antenna elements, where each antenna element may have an amplitude weight and a phase shift in the general case, or equivalently, the signal transmitted from the antenna element may be multiplied with a complex number, the weight. If the antenna elements are placed in two or three dimensions, and thus, not only on a straight line, then two dimensional beamforming is possible, where the beam pointing direction may be steered in both horizontal and azimuth angle. Sometimes, also three Dimensional (3D) beamforming is mentioned, where also a variable transmit power has been taken into account. In addition, the antenna elements in the antenna array may consist of different polarizations, and hence it is possible, by adjusting the antenna weights, to dynamically alter the polarization state of the transmitted electromagnetic wave. Hence, a two dimensional array with elements of different polarizations may give a large flexibility in beamforming, depending on the antenna weights. Sometimes, a certain set of precoding weights are denoted as a "beam state", generating a certain beam in azimuth, elevation and polarization as well as power.

The most flexible implementation may be to use a fully digital beamformer, where each weight may be applied independent of each other. However, to reduce hardware cost, size and power consumption, some of the weighting functionality may be placed in hardware, e.g., using a Butler matrix, whereas other parts may be controlled in software. For instance, the elevation angle may be controlled by a Butler matrix implementation, while the azimuth angle may be controlled in software. A problem with the hardware beamforming may be that it involves switches and phase shifters, which may have some switching latency, making instant switching of beam unrealizable.

The PBCH is transmitted using the Common Reference Signals (CRS) as a demodulation reference. Since the PSS, SSS and the PBCH channel are intended for any UE that wishes to attach to the cell, they are typically transmitted in a cell broad coverage, typically using e.g., 120 degree sectors. Hence, such signals are not beamformed in LTE, as it is a risk that, e.g., the PSS and SSS will be in the side lobe or even in a null direction of the beamforming radiation pattern. This would lead to failure in synchronizing to the cell, or failure in detecting MIB.

Existing methods for transmission of synchronization signals from a network node to a wireless device are designed for wide area coverage at lower carrier frequencies of transmission than those expected to be used in future systems. These current methods may lead to numerous synchronization failures when used in communication systems using high frequency carriers, such as those projected to be used in the future 5G system.

SUMMARY

It is an object of embodiments herein to improve the performance in a wireless communications network by providing an improved way for a network node to send synchronization signals, for synchronization of the wireless device with the network node and for a wireless device to detect these synchronization signals.

According to an aspect of embodiments herein, the object is achieved by a method performed by a network node for sending, to a wireless device, a first synchronization signal and an associated information message. This is done for synchronization of the wireless device with the network node. The method comprising: sending the first synchronization signal in N OFDM symbols within a subframe, at least once in a time and frequency position in every one of the N OFDM symbols, and, for each sending of the first synchronization signal, sending the associated information message at a pre-defined time and frequency position in an OFDM symbol. The pre-defined time and frequency position is relative to the time and frequency position of the first synchronization signal.

According to another aspect of embodiments herein, the object is achieved by a method performed by the wireless device for detecting the first synchronization signal and the associated information message sent by the network node. This is done for synchronization of the wireless device with the network node. The method comprising: detecting the first synchronization signal sent by the network node in N OFDM symbols within a subframe, at least once in a time and frequency position in every one of the N OFDM symbols. The method further comprising: detecting the associated information message at the pre-defined time and frequency position. The pre-defined time and frequency position is relative to the time and frequency position of the detected first synchronization signal; and obtaining subframe timing and/or frame timing by detecting an index comprised in the associated information message.

According to another aspect of embodiments herein, the object is achieved by the network node, configured to send to the wireless device the first synchronization signal and the associated information message. This is done for synchronization of the wireless device with the network node. The network node is configured to send the first synchronization signal in N OFDM symbols within a subframe, at least once in a time and frequency position in every one of the N OFDM symbols. For each sending of the first synchronization signal, the network node is configured to send the associated information message at the pre-defined frequency position in a pre-defined OFDM symbol. The pre-defined time and frequency position is relative to the time and frequency position of the first synchronization signal.

According to another aspect of embodiments herein, the object is achieved by the wireless device, configured to detect the first synchronization signal and the associated information message configured to be sent by the network node. This is done for synchronization of the wireless device with the network node. The wireless device is configured to detect the first synchronization signal. The first synchronization signal is configured to have been sent by the network node in N OFDM symbols within a subframe, at least once in a time and frequency position in every one of the N OFDM symbols. The wireless device is further configured to detect the associated information message at a pre-defined time and frequency position. The pre-defined time and frequency position is relative to the time and frequency position of the detected first synchronization signal. The wireless device is further configured to obtain subframe timing and/or frame timing by detecting the index comprised in the associated information message.

According to another aspect of embodiments herein, the object is achieved by a computer-readable storage medium, having stored thereon the computer program, comprising instructions which, when executed on at least one processor, cause the at least one processor to carry out the method performed by the network node.

According to another aspect of embodiments herein, the object is achieved by a computer-readable storage medium, having stored thereon the computer program, comprising instructions which, when executed on at least one processor, cause the at least one processor to carry out the method performed by the wireless device.

By the network node repeatedly transmitting the same first synchronization signal in N OFDM symbols within a subframe, the wireless device may more likely (blindly) detect the first synchronization signal and the associated information message, in at least one of the used symbols. Therefore a way for the wireless device to synchronize with the network node is provided that is optimized for high frequency carriers, using narrow beams. This may be implemented utilizing beamforming, for example, by the network node transmitting the same first synchronization signal in a scanned manner, such as in a new beam in each OFDM symbol, so that the wireless device may more likely detect the first synchronization signal and the associated information message, in at least one of the beams. In the embodiments utilizing beamforming, the network node does not need to know which beam is preferable for the wireless device, for the wireless device to be able to successfully detect the first synchronization signal and the associated information message, as the first synchronization signal and the associated information are transmitted in multiple beams.

Further advantages of some embodiments disclosed herein are discussed below.

BRIEF DESCRIPTION OF THE DRAWINGS

Examples of embodiments herein are described in more detail with reference to the accompanying drawings, in which.

DETAILED DESCRIPTION

Figure 1:
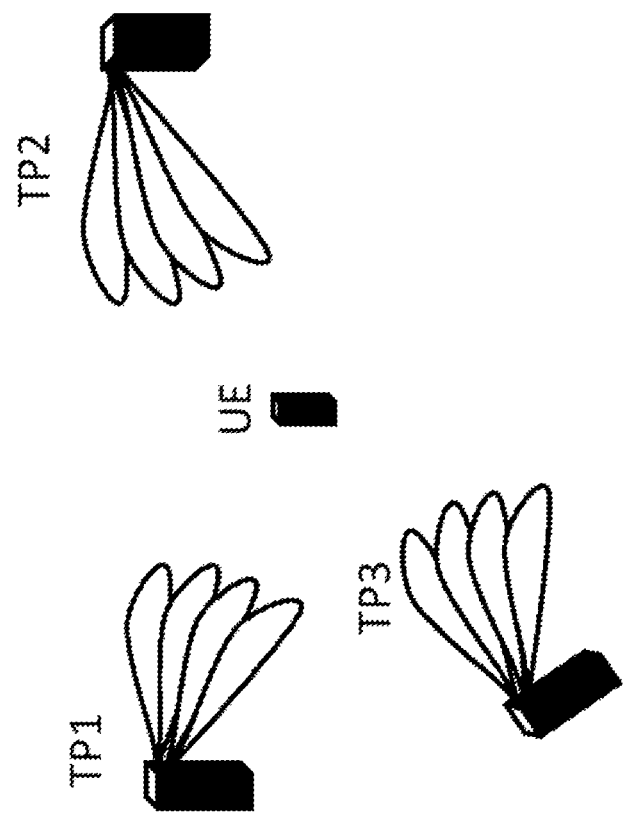
FIG. 1 is a schematic diagram illustrating a 5G system example with three TPs.

As part of the solution according to embodiments herein, one or more problems are discussed followed by solutions in accordance with embodiments herein addressing the problems.

In general terms, embodiments herein relate to the fact that at high, e.g., >10 GHz, carrier frequencies, the number of antenna elements at the transmitter and/or receiver side may be significantly increased compared to common 3G and 4G systems, which typically operate at frequencies below 3 GHz. In such systems, the increased path loss may be compensated for by beamforming. If these beams are narrow, many beams may be needed to span a coverage area.

Also in general terms, embodiments herein relate to the fact that since synchronization and system information has to be transmitted in a narrow beam, in horizontal and azimuth angles, to maintain cell coverage and link reliability, it is then a problem how to transmit these signals and how the user terminal, e.g., the wireless device, find cells, i.e. to perform cell search, and how to synchronize time and frequency of the network. It is further a problem how to attain system information from the network when this information is transmitted using beamforming and how to acquire symbol and subframe synchronization.

One of the problems addressed by embodiments herein is how to transmit synchronization signals from a network node to a wireless device in a wireless communications network using a high frequency carrier that is subject to higher path loss relative a low frequency carrier, so that detection by the wireless device is optimized and synchronization failures for failure of detection of synchronization signals are decreased.

For example, when using beamforming, one of the particular problems addressed by embodiments herein is how to use the narrow beams that may be needed to provide the high beamforming gain that may be required to achieve cell coverage in systems using high frequency carriers, also for synchronization and transmission of basic system information.

In many cases, such as a wireless device initial access, or when the wireless device is searching for additional cells, it is not possible for the network, e.g., a network node controlling one or more Transmission Points (TPs), each of the TPs transmitting Transmission Point (TP) beams, to direct a beam towards a wireless device with the necessary signals for these operations, since the useful beam, or precoding vector, for the particular wireless device is not known to the network, e.g., the network node.

Hence, there may be a problem in a network, e.g., the network node, for how to transmit synchronization signals as well as basic system information, e.g. MIB, to the wireless device in a beam-formed system.

As a consequence of this, it is a problem for a wireless device how to time and frequency synchronize to a cell and how to acquire system information and how to perform handover operations.

It is further a problem how the wireless device may attain the frame and subframe synchronization respectively as well as the OFDM symbol synchronization.

These problems are further discussed below.

A set of TPs may be considered wherein each TP can, by use of an array antenna, generate transmission of a larger number of different beams, wherein the beams may have different main lobe pointing direction and/or transmit polarization state.

A given beam may be represented by a certain precoding vector, where for each antenna element a signal is replicated and transmitted over, an amplitude and/or phase weight is applied. The choice of these weights thus may determine the beam, and, hence, the beam pointing direction, or "beam state".

The possibility to choose from a large number of beams to be transmitted from a TP may be typical for a 5G system deployed at higher carrier frequencies above 10 GHz, where the antenna may consist of many antenna elements to achieve a large array gain. However, larger number of beams may be applied also in systems operating at lower frequencies, e.g., below 10 GHz, for improved coverage, with the drawback of a larger total antenna size, since the wavelengths are longer.

At higher carrier frequencies, an antenna array consisting of multiple antenna elements may be used to compensate for the reduced aperture size of each element, which is a function of the carrier frequency, compared to systems operating at traditional cellular carrier frequencies, i.e., up to 5 GHz. Moreover, the large antenna gain may in turn containing the complex beamforming weights be needed to overcome the path loss at higher frequencies. The large array gain and many antenna elements may result in that each generated beam is rather narrow, when expressed in terms of HPBW, typically only 5-10 degrees or even smaller, depending on the particular design of the array antenna. Usually, two-dimensional beamforming may be desirable, where a beam may be steered in both an azimuthal and a horizontal direction simultaneously. Adding also the transmit power to a variable beam, the coverage of the 2D-beam may be controlled, so that a 3D beamforming system may be achieved.

Since the large array gain may be needed also for synchronization and broadcast control channels, e.g., carrying basic system information for accessing the cell, these signals may need to be beam-formed as well.

Synchronization is a cornerstone in accessing a wireless communications network. The synchronization may be performed on several levels, the initial time and frequency synchronization may be needed to tune the receiver to the used OFDM time frequency grid of resource elements, as the OFDM symbol boundary. Then, synchronization may also be needed to detect the subframe boundaries, e.g., in LTE, a subframe consists of 14 OFDM symbols in the case of normal Cyclic Prefix (CP) length. Furthermore, the frame structure may need to be detected, so the wireless device knows when a new frame begins, e.g., in LTE, a frame consists of 10 subframes.

In order to solve the problems mentioned above, there is provided a method performed by a network, e.g., a network node, to enable the use of multiple transmit beams and at the same time provide any of: rapid cell detection, system information acquisition and symbol, subframe and frame synchronization, for a wireless device that may try to connect to a cell, e.g., served by the network node. The proposed method also may seamlessly allow for different network implementations, e.g., a network node implementations, and wireless device implementations, which may be important, since some implementations may use analog beamforming networks where the beam switching time using analog components may be too long for a switch to be performed within the time between two OFDM symbols, i.e., at a fraction of the CP length. Also, some wireless device implementations may have a restriction in, e.g., cell search computation power so that less frequent cell searches than once per OFDM symbol should not unnecessarily restrict the possibility to access the cell, other than potentially an increased access delay.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Figure 2:
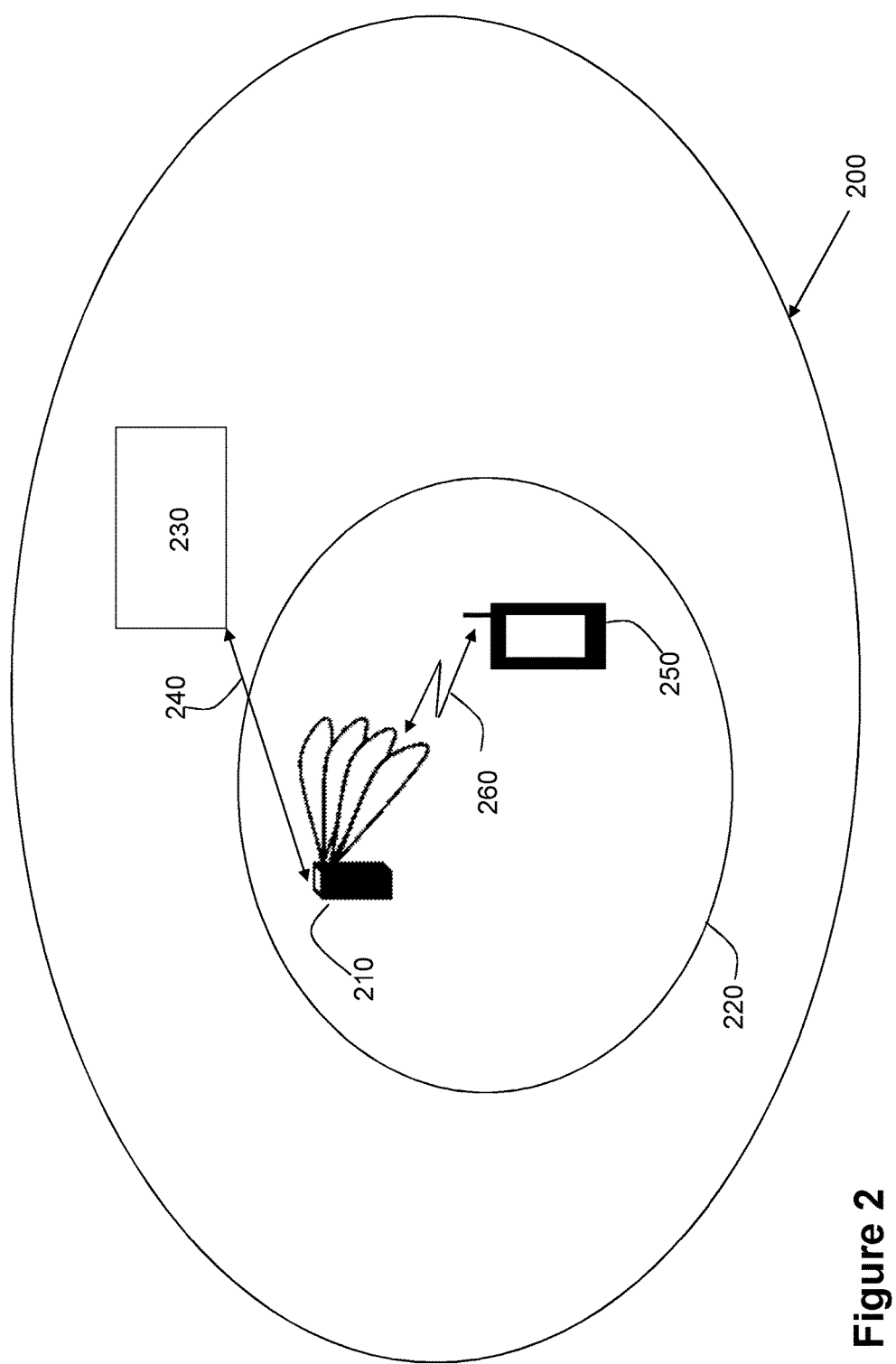
FIG. 2 is a schematic block diagram illustrating embodiments in a wireless communications network, according to some embodiments.

FIG. 2 depicts a wireless communications network 200 in which embodiments herein may be implemented. The wireless communications network 200 may for example be a network based on Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Worldwide Interoperability for Microwave Access (WiMax), 5G system or any cellular network or system employing multiple beams.

The wireless communications network 200 comprises a transmission point, or TP, 210. The transmission point 210 transmits one or more TP beams. The transmission point 210 may be, for example, a base station such as e.g., an eNB, eNodeB, or a Home Node B, a Home eNode B, femto Base Station, BS, pico BS or any other network unit capable to serve a device or a machine type communication device in the wireless communications network 200. In some particular embodiments, the transmission point 210 may be a stationary relay node or a mobile relay node. The wireless communications network 200 covers a geographical area which is divided into cell areas, wherein each cell area is served by a TP although, one TP may serve one or several cells, and one cell may be served by more than one TP. In the non-limiting example depicted in FIG. 2, the transmission point 210 serves a cell 220. The transmission point 210 may be of different classes, such as e.g. macro eNodeB, home eNodeB or pico base station, based on transmission power and thereby also cell size. Typically, the wireless communications network 200 may comprise more cells similar to cell 220, served by their respective one or more TPs. This is not depicted in FIG. 2 for the sake of simplicity. The transmission point 210 may be referred to herein as a network node 210. The network node 210 controls one or more TPs, such as any of the network node 210.

The network node 210 may support one or several communication technologies, and its name may depend on the technology and terminology used. In 3GPP LTE, the network node 210, which may be referred to as eNodeBs or even eNBs, may be directly connected to one or more networks 230.

The network node 210 may communicate with the one or more networks 230 over a link 240.

A number of wireless devices are located in the wireless communications network 200. In the example scenario of FIG. 2, only one wireless device is shown, wireless device 250. The wireless device 250 may communicate with the network node 210 over a radio link 260.

The wireless device 250 is a wireless communication device such as a UE which is also known as e.g. mobile terminal, wireless terminal and/or mobile station.

The wireless device 250 may further be referred to as a mobile telephone, cellular telephone, or laptop with wireless capability, just to mention some further examples. The wireless device 250 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a cellular communications system. Further examples of different wireless devices, such as the wireless device 250, that may be served by such a system include, modems, or Machine Type Communication (MTC) devices such as sensors.

Embodiments of methods performed by the network node 210 and the wireless device 250 will first be described in detail, with illustrative examples, in relation to FIGS. 2-8. An overview of the specific actions that are or may be carried out by each of the network node 210 and the wireless device 250 to perform these examples, among others, will then be provided in relation to FIGS. 9 and 10.

In embodiments herein, a first synchronization signal such as a Primary Synchronization Signal (PSS) is transmitted by the network node 210 to the wireless device 250, repeatedly, N times, in N different OFDM symbols within a subframe, or across multiple subframes. The N transmissions need not occur in adjacent OFDM symbols, they may occur in every other OFDM symbol or more generally even in different subframes or frames. For each PSS transmission instance, the TP, e.g., the network node 210 or TP 210, may alter one or several of the parameters associated with the transmission, such as the azimuth angle, the horizontal angle, the transmit power or the polarization state. A given setting of all these possible transmission parameters is defined here as a beamforming state. Hence, the network node 210 or TP 210 may scan the 3D beamforming and polarization space in up to N different beamforming states, and in each state, the network node 210 or TP 210 may transmit the same PSS to provide synchronization for a UE, such as the wireless device 250, in any of these 3D positions. After these N transmissions have been performed, the 3D scan may start over from the beginning again, and the value N may, if needed for the wireless device 250, be specified in the standard, or it may also be signaled to the wireless device 250 by system information, or obtained prior to accessing the 5G carrier through signaling on a legacy system, such as LTE. The PSS may be taken by the network node 210 from a large set of sequences, similar to the PSS used in LTE, where the detection of the PSS may give the wireless device 250 information about a physical cell ID, such as a physical cell ID of cell 220. The PSS may also be used by the wireless device 250 to get a rough time and frequency synchronization. Note that the embodiments described herein are not limited to use the same or similar PSS as used in LTE, a completely different design or sequence length may also be considered.

The UE, such as the wireless device 250, in a favorable position for one, or several, of the N beam states may successfully detect the PSS, when this beam state is used, and may also acquire a physical cell ID, such as the physical cell ID of cell 220, if an LTE type of PSS is used. The network node 210 or TP 210 may also transmit an associated information message such as a SSS, at a known location relative to the PSS. So, when the PSS in a certain OFDM symbol has been detected by the wireless device 250, the wireless device 250 may also find the associated SSS at a different time and/or frequency position relative to the PSS. The SSS may then be transmitted by the network node 210 with the same beamforming state as the associated PSS. One way to implement this is for the network node 210 to transmit the SSS multiplexed with the PSS, in the same OFDM symbol (see FIG. 3). Another alternative may be to split the SSS in two parts, where each part is on either side of the PSS, to get a symmetric transmission of PSS and SSS with respect to the center frequency.

Figures 3, 4:
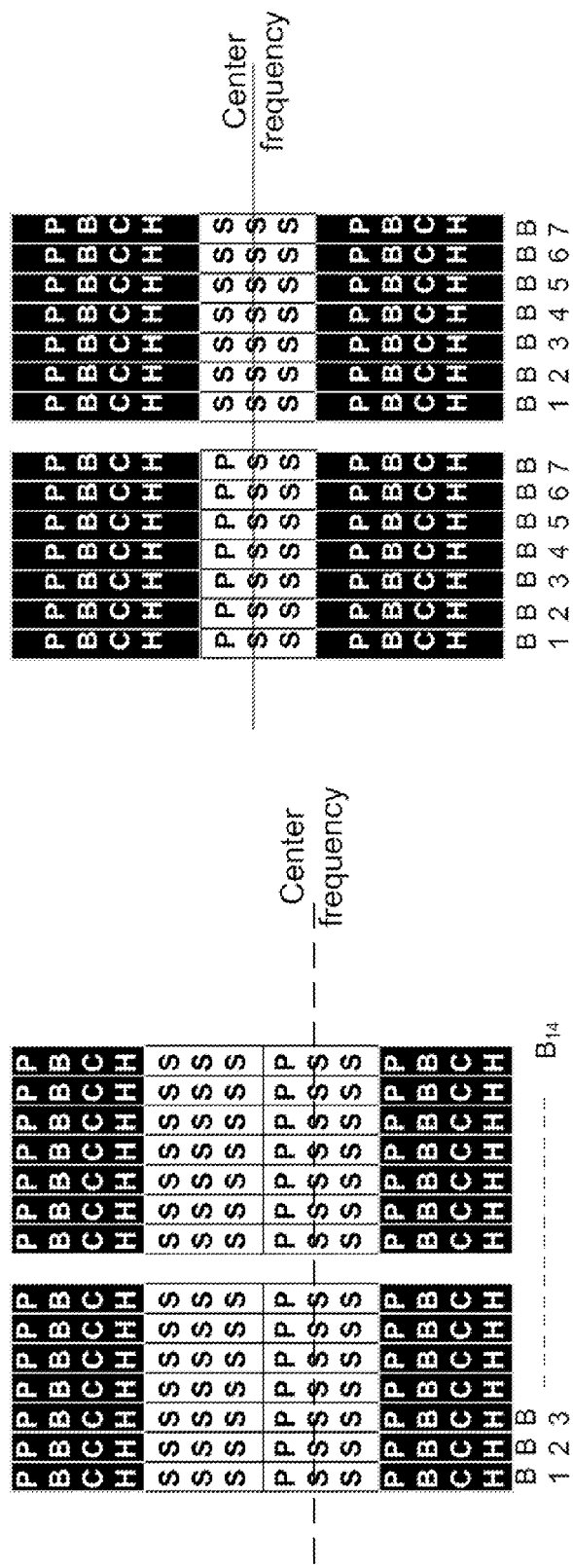
FIG. 3 is a schematic diagram illustrating a subframe including PSS, SSS and PBCH.
FIG. 4 is a schematic diagram illustrating another subframe including PSS, SSS and PBCH.

FIG. 3 depicts an example showing a subframe of 14 OFDM symbols, where the PSS and SSS are transmitted by the network node 210 in the same symbol, but at different frequency locations, i.e. subcarrier sets. In each OFDM symbol, a different beam state (B1 . . . B14) may be used by the network node 210 to scan the beams in, for example, the horizontal angle and the azimuth angle. Furthermore, the PBCH, carrying system information, may also be transmitted, by the network node 210, in the same OFDM symbol as the associated PSS and SSS, and in this example, split on both sides of the PSS. Thus, in some embodiments, one or more PBCH may be associated with one PSS. Note that the system bandwidth may be larger than what is shown in this figure. Here, only the concept of frequency multiplexing the PSS/SSS/PBCH is illustrated. The OFDM symbol may also contain other control signaling, or the shared data channel, outside, i.e., on both sides, the frequency band, that carries the PSS/SSS/PBCH. The network/TP, e.g., the network node 210 or TP 210, may, with this arrangement, transmit each OFDM symbol using a different beamforming state. Alternatively, the network node 210 or TP 210 may transmit the PSS/SSS/PBCH part of the OFDM symbol with a first beamforming state and the remainder of the OFDM symbol, e.g., on both sides, with beamforming states that are independently selected and may thus be different from the first beamforming state. In this way, for instance, the shared data channel may be frequency multiplexed with the PSS/SSS/PBCH and yet, these, i.e., the PSS/SSS/PBCH, are using different beams, i.e. beamforming states.

In some embodiments herein, the SSS and one or more PBCH associated, i.e., transmitted, with a particular PSS, may be collectively referred to herein as a message that is associated to the PSS, i.e., an associated information message.

However, different from the PSS, each SSS may contain information about the subframe timing, such as the subframe offset and/or the frame offset relative the SSS time position. Hence, different Secondary Synchronization (SS) sequences may be transmitted by the network node 210 for each OFDM symbol, and thus, up to N different SSS may be used by the network node 210. By detecting which SS sequence is transmitted in a certain OFDM symbol, i.e. a "sequence index", the wireless device 250 may acquire at least the subframe synchronization, by using a pre-defined unique mapping between the sequence index and the relative position of the OFDM symbol and the subframe boundaries. Hence, the subframe synchronization is achieved, in the sense that the wireless device 250 may know where the subframe begins and ends. The SSS may also be used by the wireless device 250 to acquire the frame synchronization; however, this may require the use of additional SSS sequences. If only the subframe synchronization is required, or if the PSS/SSS is only transmitted in one pre-defined subframe within the frame, then the same SSS may be repeatedly used by the network node 210 in every subframe carrying SSS; while in the case also frame synchronization may be needed from SSS by the wireless device 250, then different subframes within the frame may need to use unique SSS sequences to be able to acquire the relative distance to the frame boundaries from the detected OFDM symbol.

The SSS used in embodiments herein may or may not be equal to the LTE SSS. Since there are only 168 different SSS in LTE, these may not be enough if also used for subframe synchronization in addition to time and frequency synchronization, since a different SSS may be used by the network node 210 in each beam. However, a larger set of SSS may be defined. This may, in different embodiments, be defined as an extension of the LTE SSS, by transmitting from the network node 210, in each OFDM symbol, additional cyclic shift combinations of the two interleaved M-sequences.

In another embodiment, the network node 210 may use the LTE SSS together with at least a third sequence, or a reference signal, for instance, the reference signal used when demodulating the PBCH.

Moreover, to acquire system information, the PBCH may be transmitted by the network node 210 in the same beam, and thus OFDM symbol, as the SSS, at a known location relative to the SSS and/or PSS. The PBCH may be transmitted together with a demodulation reference signal which resides in the same OFDM symbol as the PBCH, i.e., the reference signal for PBCH demodulation and the PBCH itself are precoded with the same beamforming weight vector, i.e. the same beam state. Hence, the wireless device 250 is not allowed to interpolate the channel estimates across OFDM symbols where different beam states have been used. Thus, in a sense, these reference signals are beam specific.

In one embodiment, the same PBCH information is transmitted by the network node 210 in each transmission instance within a frame. In a wireless device 250 implementation embodiment, the wireless device 250 may accumulate the PBCH from multiple transmissions from the network node 210, e.g., multiple OFDM symbols and thus multiple beams, and thus improve the reception performance of the PBCH, which contains the system information. In some cases, the wireless device 250 detects a signal in multiple beams and it may, after detecting the PSS with sufficient power, use the associated PBCH in the same beam, to accumulate energy for the PBCH detection. However, the channel estimations in the wireless device 250 implementation may need to be repeated in each OFDM symbol, since beam specific RS may be used. This may enable coherent receive combining of multiple beams which, in addition to the beamforming gain, may further enhance the MIB reception by the wireless device 250. The wireless device 250 may in a further embodiment also discard PBCH reception in the OFDM symbols, i.e. beams, where the PSS has poor detection performance, as to avoid capturing noisy estimates into the PBCH energy accumulation.

It is possible that the wireless device 250 may detect the PSS in more than one OFDM symbol, since the 3D beams may have overlapping coverage, either in terms of overlapping beam patterns or via multipath reflections in the propagation channel. In this case, the wireless device 250 implementation may estimate which of the successfully detected OFDM symbols comprised the PSS detection with the highest receive quality, and use only this when determining the subframe and/or frame timing, to ensure good synchronization performance. It is also an implementation embodiment for the network/TP side, e.g., the network node 210 or TP 210, to use fewer and/or wider than N beams for the PSS, where N is a specified upper limit on the number of supported beams in a 5G network, in which case there are more than a single beam with good PSS detection possibility for the wireless device 250. Using wider beams reduces the coverage of each beam, but in some situations coverage may be less important, such as small cells. This embodiment with wider beams may have the advantage that PSS detection is more rapid, and the normal LTE cell search algorithm of relatively low complexity may be re-used in the wireless device 250.

A further advantage of at least some embodiments described herein may be that there may be no need for the wireless device 250 to search for beams at the initial PSS detection; the wireless device 250 simply may detect successfully when a 3D beamforming state matches the wireless device 250 position in the cell 220. Hence, the use of beams is agnostic to the wireless device 250, at least at this initial stage of PSS detection. See FIG. 3 for an example of how the PSS/SSS and PBCH may be transmitted by the network node 210 in the described embodiment.

In an alternative embodiment to the above described method, the same SSS sequence may be transmitted in each used OFDM symbol/beam state, while the frame and/or subframe offset may be instead explicitly indicated in the PBCH in the associated OFDM symbol. Hence, MIB detection by the wireless device 250 may in this embodiment be required before frame synchronization may be achieved. A benefit of this embodiment may be that only one SSS is used, or consumed, per TP, repeatedly in all OFDM symbols, while the drawback may be that the MIB changes in each OFDM symbol, so coherent combining over beams may not be used by the wireless device 250. In addition, a beam index n={1, ..., N} may be signaled in the PBCH, to inform the wireless device 250 on which beam state of the maximally possible N beam states was used in the particular OFDM symbol. The PBCH may also comprise explicit signaling of the subframe offset and/or the frame offset. In some embodiments, the beam state n may not be informed to the wireless device 250, but this offset signaling still provides necessary information to the wireless device 250 to be able to acquire subframe and/or frame synchronization.

In yet an alternative embodiment, the SSS may be used by the wireless device 250 for detecting the subframe offset and the PBCH may be used by the wireless device 250 to detect the frame offset. Hence, the PBCH message may be the same for all OFDM symbols/beams within one subframe but may need to change from subframe to subframe, since the frame offset changes. See the figures below for illustrative examples. In this embodiment, at most 14 different SSS may be required, and the set of SSS may then be repeated in the next subframe. This is sufficient since SSS is only used to acquire the subframe timing.

FIG. 4 depicts an example showing a subframe of 14 OFDM symbols, where the PSS and SSS are transmitted by the network node 210 in different symbols, with a time offset, in this case one slot, i.e., 7 OFDM symbols. Furthermore, the PBCH, carrying system information, is also transmitted by the network node 210 in the same OFDM symbol as the associated PSS and SSS, and in this example split on both sides of the PSS. Note that the system bandwidth may be larger than what is shown in this figure. Here only the concept of frequency multiplexing the PSS/PBCH or SSS/PBCH is illustrated, and the OFDM symbol may also contain other control signaling or the shared data channel. The network/TP, e.g., the network node 210 or TP 210, may, with this arrangement, transmit each OFDM symbol using a different beamforming state. But in this example, the same beamforming state is used in symbol k and k+7 in the subframe, where k=0, ..., 6. So a UE, such as the wireless device 250, that detects the PSS in OFDM symbol k due to a beneficial beamforming state, may also get the same beamforming state in symbol k+7 when detecting SSS and PBCH. Hence, in each OFDM symbol in each slot, a different beam state, e.g., B1 ... B7, may be used by the network node 210 to scan the beams in, for example, the horizontal angle and the azimuth angle. An advantage of this separation in time between the PSS and SSS, e.g., 7 OFDM symbols, compared to the embodiment in FIG. 3, is that the PSS and SSS together may be used to enhance the frequency synchronization, which is more difficult by the arrangement in FIG. 3, since the same OFDM symbol is used for PSS and SSS.

Figures 5, 7:
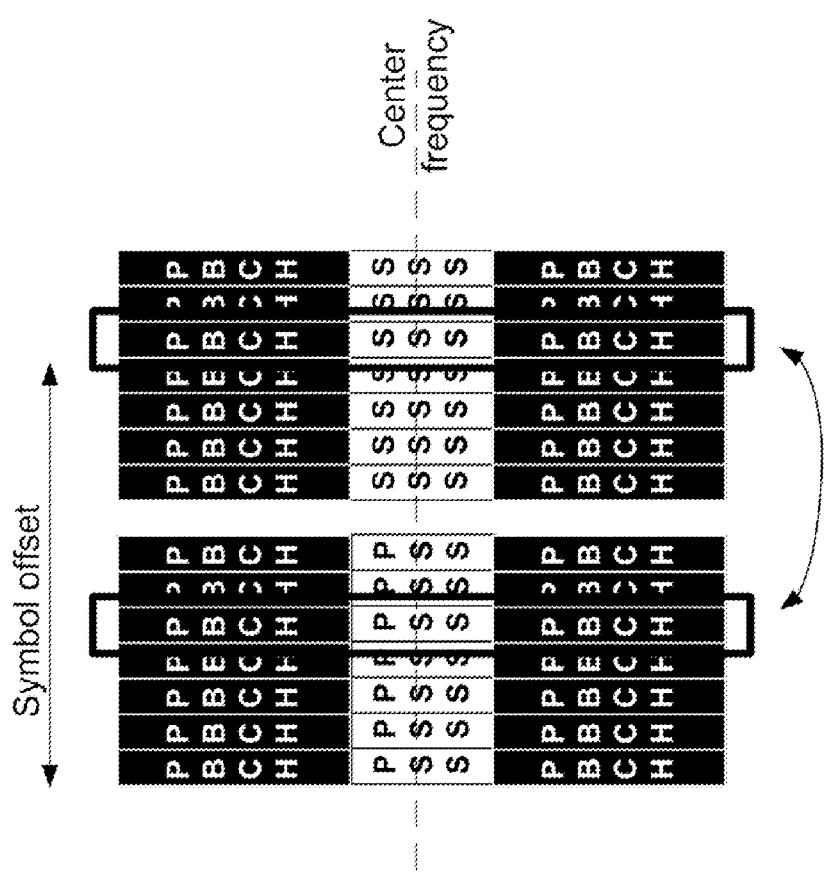
FIG. 5 is a schematic diagram illustrating detection of a PSS, SSS and PBCH
FIG. 7 is a schematic diagram illustrating a subframe including 7 OFDM symbols

FIG. 5 depicts an example showing an example of a positive detection by the wireless device 250 of PSS in OFDM symbol k=5, and thus, also SSS and PBCH detection in OFDM symbol k=12, since the network node 210 or TP 210 uses the same beamformer state in symbol k=5 and k=12 from which the wireless device 250 acquires at least the subframe offset Delta_S=12 to the start of the subframe from either the SSS, for the embodiment where each SSS is different, or the PBCH information. In FIG. 5, subframe offset, as used herein, is represented as "symbol offset". Also, OFDM symbols k=5 and k=12 are indicated by the double arrow.

Figure 6:
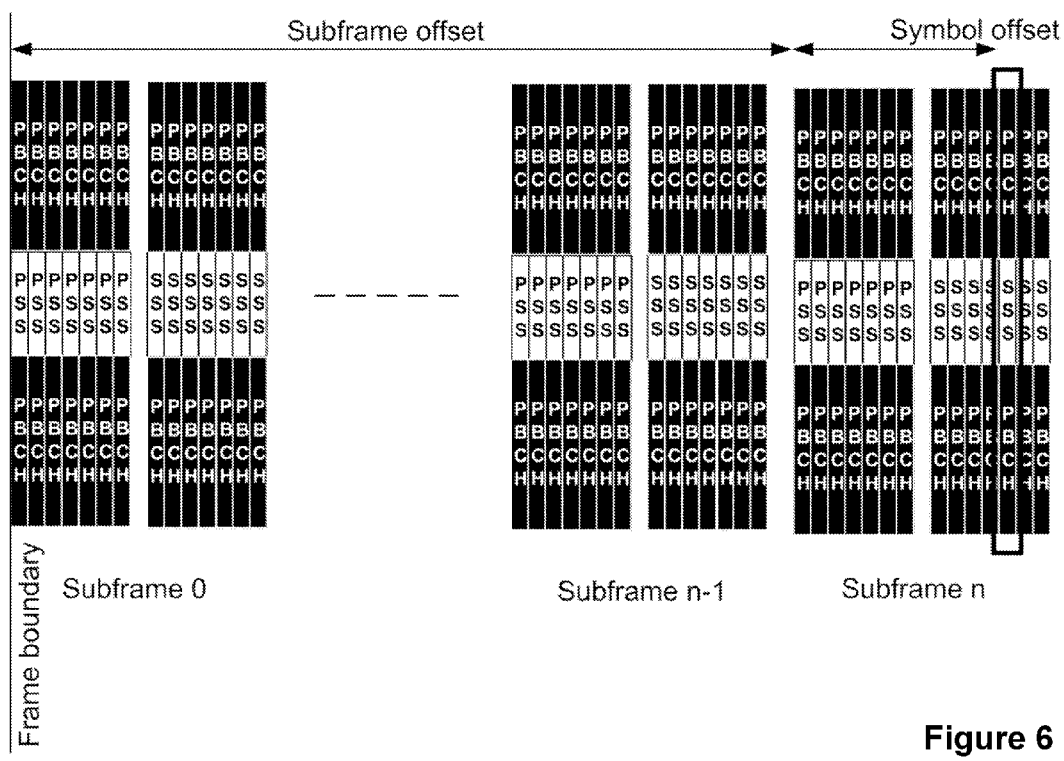
FIG. 6 is a schematic diagram illustrating subframes including PSS, SSS and PBCH.

FIG. 6 depicts an example showing a positive detection by the wireless device 250 of a beam in OFDM symbol k=5, PSS, and k=12, SSS, in subframe n. The wireless device 250 acquires the subframe offset and the frame offset from the detection of SSS and/or the detection of PBCH. In FIG. 6, subframe offset, as used herein, is represented as "symbol offset", and frame offset, as used herein, is represented as "subframe offset". An alternative embodiment may use SSS for detecting by the wireless device 250, the subframe offset and PBCH to detect the frame offset. Hence, the PBCH message is the same for all OFDM symbols/beams within one subframe, but may need to change from subframe to subframe, since the frame offset changes.

In FIG. 6, multiple subframes are used to allow for the network node 210 or TP 210 to use more than 7 beam states, i.e. N>7, in the scanning procedure. In this example, N=7n beams may be scanned if n is the number of used subframes. If this many beams are unnecessary and it is determined that N<8 is sufficient, only a single subframe may be used by the wireless device 250 for this cell acquisition procedure, i.e., time and frequency synchronization and detection of the cell ID. In this case, the frame offset may be a predefined value instead of being explicitly signaled by the network node 210, hence the value may be given by reading the standard specifications, and it may be selected, e.g., as zero or nine, first or last subframe in the frame.

With the arrangement described in embodiments herein, the number of used beam states of a TP, such as the network node 210 or TP 210, may be less than the maximal number N the current standard supports, since the offsets are signaled by SSS and/or PBCH. Moreover, the precoding weights that defined the beam state may be transparent to the wireless device 250, hence with this arrangement, any beam shapes, i.e., precoding weights, for PSS, SSS and PBCH may be implemented, which may be an advantage and gives flexibility to the wireless communications network 200. Hence, embodiments herein may provide a flexible way to deploy a 5G multi antenna 3D beamforming system, so it may be adapted to the scenario of the operation, and also to the actual implementation of the network node 210 or TP 210. An advantage of at least some of the embodiments herein may be that the PSS and SSS and/or PBCH are transmitted by the network node 210 in the same OFDM symbol, which may necessary when analog beamforming is performed at the transmitter side, since beamforming precoding weights may be only wideband in this case. For a digital implementation of the beamformer on the other hand, different beams may be used in different frequency bands. However, since implementations may be widely different among TP vendors and even for different products within a same vendor, the solution may not imply a certain TP implementation of beamforming, and this goal may be achieved with embodiments herein.

In a further network node 210 or TP 210 implementation embodiment, it may be possible to further relax the network node 210 or TP 210 implementation by not transmitting the PSS etc in every OFDM symbol. This may be useful in, e.g., the case switching time or precoder weight settling time is long. Hence, the same approach in embodiments herein may also enable this type of relaxed operation, where not every OFDM symbol may be used for transmitting by the network node 210, since the subframe and frame offsets may be acquired by the wireless device 250 individually, in each used OFDM symbol respectively. Whether every or as in the example below, every other OFDM symbol is transmitting PSS etc, is agnostic to the wireless device 250, since the wireless device 250 may simply fail to decode a PSS in OFDM symbols where no transmission by the network node 210 takes place.

FIG. 7 depicts an example where only every other OFDM symbol is used by the network node 210, so that TP beamforming hardware may have sufficient time to switch beam. In this example shown here, only 7 beams may be scanned in one subframe.

The previous embodiments have described general aspects of the embodiments herein. The further embodiments below will describe enhancements that will relax the wireless device 250 implementation, in case the wireless device 250 has limited processing power.

In FIG. 4, it was shown how the PSS and SSS may be separated by one slot (i.e. 7 OFDM symbols). However, the network node 210 may separate the PSS and SSS even more, by several subframes, as long as the time between PSS and SSS transmissions by the network node 210 are known to the wireless device 250.

The PSS may be detected by the wireless device 250 in time domain, before Fast Fourier Transform (FFT) operation, using a down sampled signal if the PSS bandwidth is much less than the system bandwidth. However, the SSS and PBCH may be detected by the wireless device 250 in frequency domain, after FFT operation on the wideband signal, which may require some more processing power in the wireless device 250, and which then may require the wireless device 250 to buffer the whole wideband signal in each OFDM symbol until the PSS detector for a given OFDM symbol has finished the detection. So, it may be useful if the time between the PSS detection and the SSS/PBCH detection may be extended, so that buffering of many OFDM symbols is not required by the wireless device 250. The embodiment depicted in FIG. 4 may allow this, since the network node 210 transmits the PSS and SSS in such way that there are 7 OFDM symbols between PSS and SSS. Hence, the wireless device 250 implementation may search for the PSS using the time domain signal, after successful PSS detection, it may prepare to perform an FFT operation of the OFDM symbol transmitted 7 OFDM symbols later, thereby relaxing the wireless device 250 implementation.

In a further wireless device 250 implementation embodiment, the time between PSS and SSS transmission by the network node 210 using the same beam is longer than the slot duration. The SSS may be transmitted by the network node 210 several subframes later, as long as this delay time is known by specification. The wireless device 250 may know the delay until the same OFDM symbol and beam state using the same PSS/SSS/PBCH transmission occurs again, and may thus wait until this delayed OFDM symbol, perform the FFT and detect SSS and PBCH. Alternatively, there may be a periodicity in the beam scanning, so that the wireless device 250 may know that the same beam may be used again after a certain time, and this value may also depend on the maximum number of beam states N. Hence, the wireless device 250 may take advantage of the periodicity of the same signal transmission by the network node 210, and use of same beam state by the network node 210, and it may, in the first instance, use the time domain signal to detect PSS and in a later, second instance, it may perform the FFT and detect SSS and PBCH.

In a further embodiment, the wireless device 250 may inform the network node 210 or TP 210 about which beam or beams was used in synchronizing to the network node 210 or TP 210. This may be useful in subsequent downlink transmissions from the network node 210 or TP 210 to the wireless device 250, for instance when transmitting additional system information blocks, configuration of the wireless device 250, or scheduling the uplink and downlink shared data channels.

Figure 8:
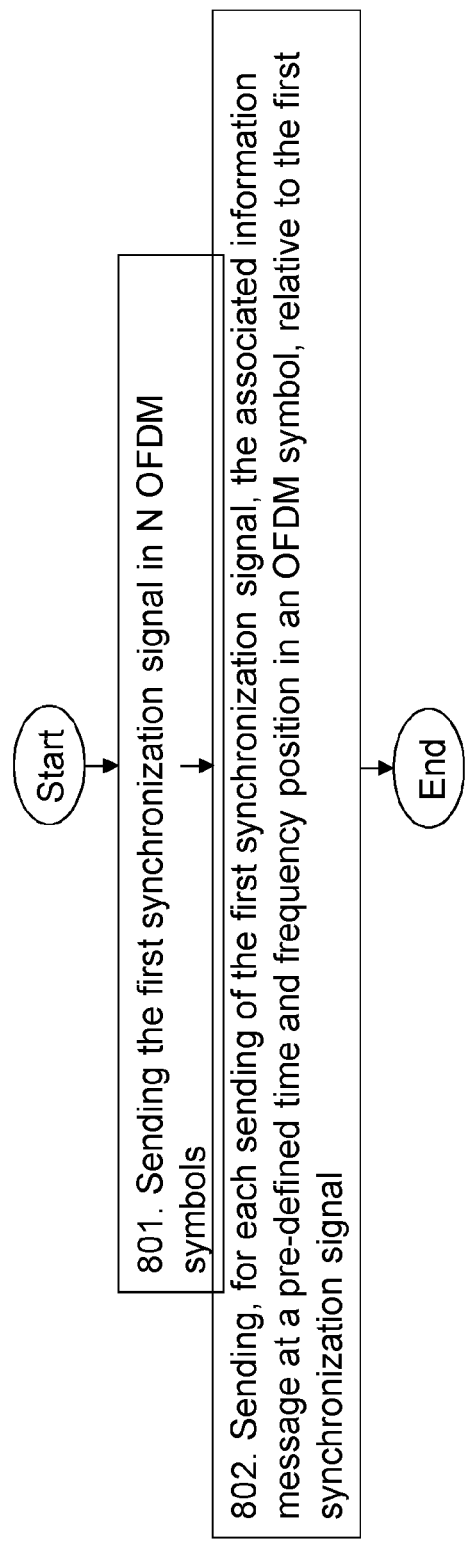
FIG. 8 is a schematic diagram illustrating embodiments of a method in a network node, according to some embodiments.

According to the detailed description just provided with illustrative examples, embodiments of a method performed by the network node 210 for sending to the wireless device 250 a first synchronization signal and an associated information message, for synchronization of the wireless device 250 with the network node 210, will now be described with reference to the flowchart depicted in FIG. 8. Any of the details provided above in the illustrative examples, may be applicable to the description provided in regards to FIG. 8, although they are not repeated here to facilitate the overview of the method. The network node 210 and the wireless device 250 operate in the wireless communications network 200, as stated earlier. FIG. 8 depicts a flowchart of the actions that are performed by the network node 210 in embodiments herein.

The method comprises the following actions, which actions may as well be carried out in another suitable order than that described below.

Action 801

In order to allow the wireless device 250 to synchronize with the network node 210, that is in order to allow the wireless device 250 to obtain subframe timing and/or the frame timing in the signals sent by the network node 210, the network node 210 sending the first synchronization signal in N OFDM symbols within a subframe, at least once in a time and frequency position in every one of the N OFDM symbols, as illustrated in FIGS. 3-6.

The first synchronization signal may provide the time structure on the smallest time scale up to a medium time scale, e.g., OFDM symbol timing, as well as the time position of the second synchronization signal.

The first synchronization signal may be a PSS, as described earlier, or an equivalent synchronization signal. The detailed description provided above, has used PSS as an illustrating example. However, any reference to PSS in the embodiments herein is understood to equally apply to the first synchronization signal.

In some embodiments, the network node 210 may perform the sending by utilizing beamforming.

In some embodiments, such as those utilizing beamforming, a different beam state, as described earlier, is used in at least two of the N OFDM symbols.

A different beam state may be used in each of the N OFDM symbols.

In some embodiments, the N OFDM symbols are non-consecutive OFDM symbols.

Action 802

Also in order to allow the wireless device 250 to synchronize with the network node 210, in this action, the network node 210, for each sending of the first synchronization signal, sending the associated information message at a pre-defined time and frequency position in an OFDM symbol, as illustrated in FIGS. 3-6. The pre-defined time and frequency position is relative to the time and frequency position of the first synchronization signal. The associated information message is associated with the first synchronization signal, that is, it comprises information that is associated with the first synchronization signal, for synchronization purposes. That is, the associated information message comprises information allowing the wireless device 250 to obtain subframe and/or frame timing.

In some embodiments, the associated information message comprises an associated second synchronization signal. The second synchronization signal may provide the time structure from a medium time scale up to a large time scale, e.g., subframe and/or frame timing. The second synchronization signal may be a SSS, as described earlier, or an equivalent synchronization signal. The detailed description provided above, has used SSS as an illustrating example. However, any reference to SSS in the embodiments herein is understood to equally apply to the second synchronization signal.

The associated information message may comprise an associated PBCH. In these embodiments, the associated information message may comprise the PBCH alone, or in addition to the second synchronization signal, e.g., the SSS.

In some embodiments, the associated PBCH further comprises associated system information.

In some embodiments, the network node 210 may perform the sending by utilizing beamforming. In these embodiments, wherein the first synchronization signal is sent in a beam state, the associated information message may be sent using the same beam state as the first synchronization signal associated with the associated information message.

In some embodiments, the associated information message is different in each OFDM symbol wherein the associated information message is sent.

The associated information message may comprise an index. An index may be a number that comprises a predefined unique mapping with the relative position of the OFDM symbol and the subframe and/or frame boundaries, which may allow the wireless device 250 to obtain the subframe and/or frame timing.

In some of these embodiments, the index is a sequence index, as described earlier.

In some of these embodiments, the subframe timing is obtainable by the wireless device 250 by detecting the index or the sequence index.

The sequence index representing a sequence out of a set of possible sequences. For example, in the embodiments wherein the associated information message comprises the associated second synchronization signal, the sequence index may be an index to one of the possible synchronization sequences which maps uniquely to at least a subframe offset.

In the embodiments wherein the associated information message comprises the associated PBCH, the index may be an explicit indication of the subframe offset or frame offset or both.

In some embodiments, the associated information message is the same in each OFDM symbol wherein the associated information message is sent within a subframe, and the associated information message is different in each subframe wherein the associated information message is sent within a transmitted frame. In these embodiments, wherein the associated information message comprises the index, a frame timing may be obtainable by the wireless device 250 by detecting the index.

In some embodiments wherein the associated information message comprises the associated SSS, and wherein the index is a sequence index, the subframe timing may be obtainable by the wireless device 250 by detecting the sequence index comprised in the associated SSS.

In some embodiments, wherein the associated information message comprises the associated system information, the frame timing is obtainable by the wireless device 250 by detecting the index comprised in the associated system information.

Embodiments of a method performed by the wireless device 250 for detecting the first synchronization signal and the associated information message sent by the network node 210, for synchronization of the wireless device 250 with the network node 210, will now be described with reference to the flowchart depicted depicted in FIG. 9.

The method comprises the following actions, which actions may as well be carried out in another suitable order than that described below. In some embodiments, all the actions may be carried out, whereas in other embodiments only some action/s may be carried out.

Action 901

As a first step for the wireless device 250 to obtain subframe timing and/or the frame timing in the signals sent by the network node 210, that is, in order to synchronize with the network node 210, the wireless device 250 detecting the first synchronization signal. As described earlier, the first synchronization signal has been sent by the network node 210 in N OFDM symbols within a subframe, at least once in a time and frequency position in every one of the N OFDM symbols.

As discussed above, in some embodiments, the network node 210 may have performed the sending utilizing beamforming.

Also as stated earlier, the first synchronization signal may be a PSS.

Action 902

To ensure good synchronization performance, in some embodiments, the wireless device 250 may discard detected OFDM symbols sent by the network node 210. This may happen, where detection of the first synchronization signal in the discarded detected OFDM symbols is poor according to a threshold. For example, this threshold may be based on the estimated signal to noise ratio of the detected OFDM symbol. That is, the wireless device 250 may not use discarded OFDM symbols into consideration to obtain subframe or frame timing, when estimated signal to noise ratio of a detected OFDM symbol is less than a predefined threshold.

Action 903

The method further comprises, the wireless device 250, detecting the associated information message at the pre-defined time and frequency position. The pre-defined time and frequency position is relative to the time and frequency position of the detected first synchronization signal. The associated information message corresponds to that described above. Thus, the associated information message is associated with the first synchronization signal.

The associated information message comprises the associated second synchronization signal. The second synchronization signal may be an SSS.

Detecting the associated information message may comprise matching a sequence of the detected associated information message to one of a set of possible information message sequences. As stated earlier, this set of possible information message sequences may be the SSS specified in LTE.

In some embodiments, the associated information message comprises the associated PBCH, as mentioned above.

In some of these embodiments, the associated PBCH further comprises the associated system information.

The associated information message comprises the index.

In some of these embodiments, the index is the sequence index.

In some embodiments, the sequence index comprises the index representing the sequence out of the set of possible sequences.

Action 904

The method further comprises, the wireless device 250, obtaining subframe timing and/or frame timing by detecting the index comprised in the associated information message. This is because the index comprises a pre-defined unique mapping with the relative position of the OFDM symbol and the subframe and/or frame boundaries.

In some embodiments, the associated information message is different in each OFDM symbol wherein the associated information message is sent by the network node 210. In these embodiments, the subframe timing may be obtained by the wireless device 250 by detecting the index.

In some embodiments, the associated information message is the same in each OFDM symbol wherein the associated information message is sent by the network node 210 within a subframe, and the associated information message is different in each subframe wherein the associated information message is sent by the network node 210 within a transmitted frame. In these embodiments, the frame timing may be obtained by the wireless device 250 by detecting the index.

In some embodiments, the associated information message comprises the associated SSS. In these embodiments, wherein the index is the sequence index, the subframe timing may be obtained by the wireless device 250 by detecting the sequence index comprised in the associated SSS.

In some embodiments, the associated information message comprises the associated SSS. In these embodiments, wherein the index is the sequence index, the frame timing may be obtained by the wireless device 250 by detecting the sequence index comprised in the associated SSS.

In some embodiments, the associated information message comprises the associated system information, and the frame timing is obtained may be the wireless device 250 by detecting the index comprised in the associated system information.

Action 905

In some embodiments wherein the network node 210 has performed the sending of the first synchronization signal and the associated information message utilizing beamforming, the wireless device 250 may send a message to the network node 210. The message may comprise information about which beam, of the beams beamformed by the network node 210 to send the first synchronization signal and the associated information message, was used by the wireless device 250 for synchronization. For example, the time and frequency position of the transmitted message may be used to implicitly communicate to the network node 210 which beam was used by the wireless device 250.

In some embodiments, the information in the message may comprise a beam state index of the beam that was used by the wireless device 250 for synchronization.

The wireless device 250 may send this message, for example, as a random access preamble comprising a sequence and/or time frequency resource determined by the index of the beam state that was used.

Embodiments herein may thus provide an approach to address the problems mentioned earlier, by the network node 210 repeatedly transmitting the same e.g., PSS in a scanned manner, in a new beam in each OFDM symbol. The instantaneous beam, used in a given OFDM symbol, may be unknown to the wireless device 250, who may perform a blind search after the e.g., PSS in time domain in order to acquire the OFDM symbol timing, which may be a prerequisite to transform the received signal into frequency domain, before further receiver processing. After detecting the PSS, the wireless device 250 may find the SSS and e.g., PBCH in a position relative to the PSS. Different from the PSS, the SSS and/or PBCH may be different in each OFDM symbol. By this arrangement, the wireless device 250 may acquire the symbol offset, i.e., the subframe offset, as used herein, as well as the frame offset in the wireless communications network 200. In some embodiments, this may be a beamformed network.

Figure 9:
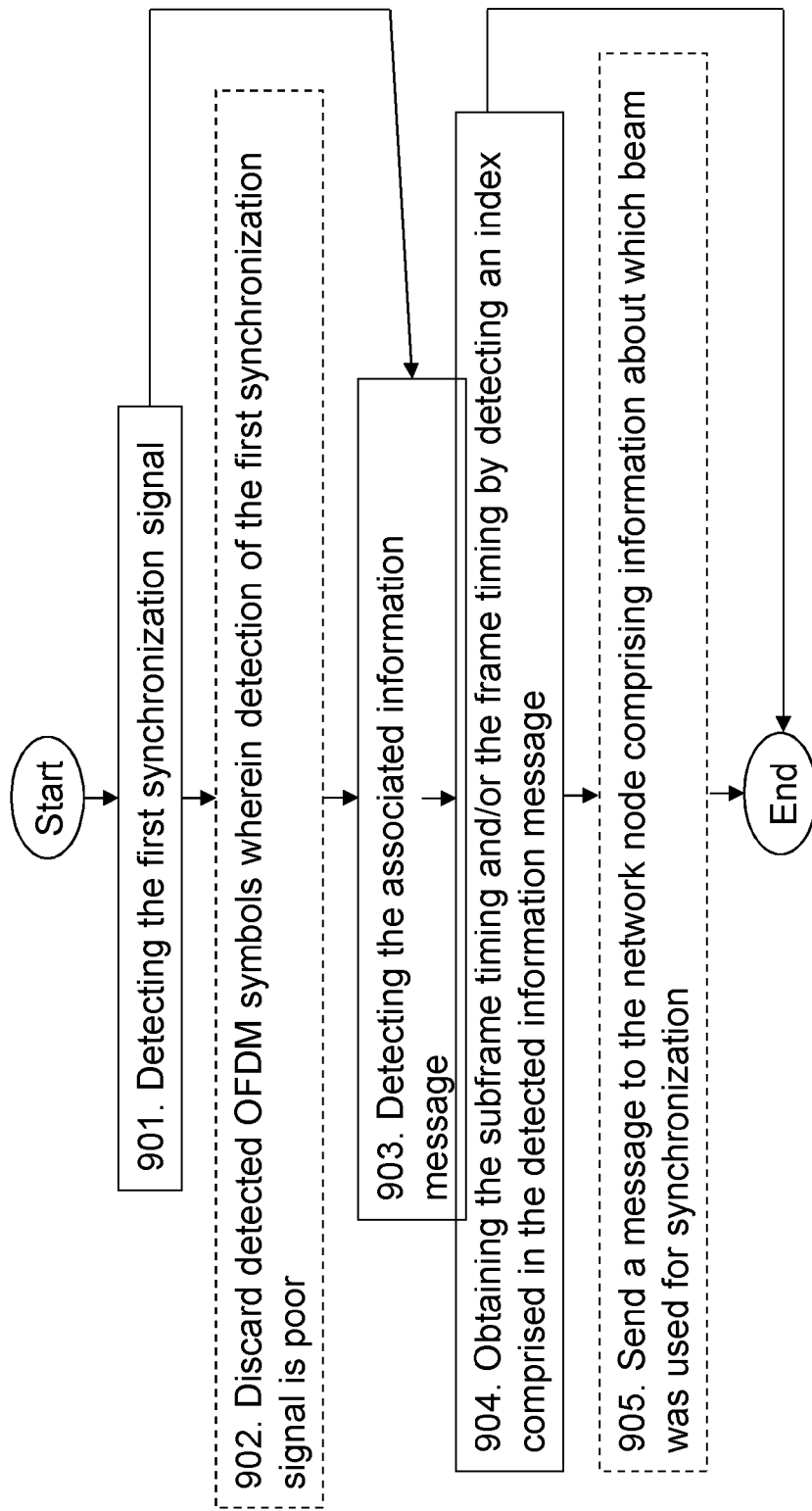
FIG. 9 is a schematic diagram illustrating embodiments of a method in a wireless device, according to some embodiments.
Figure 10:
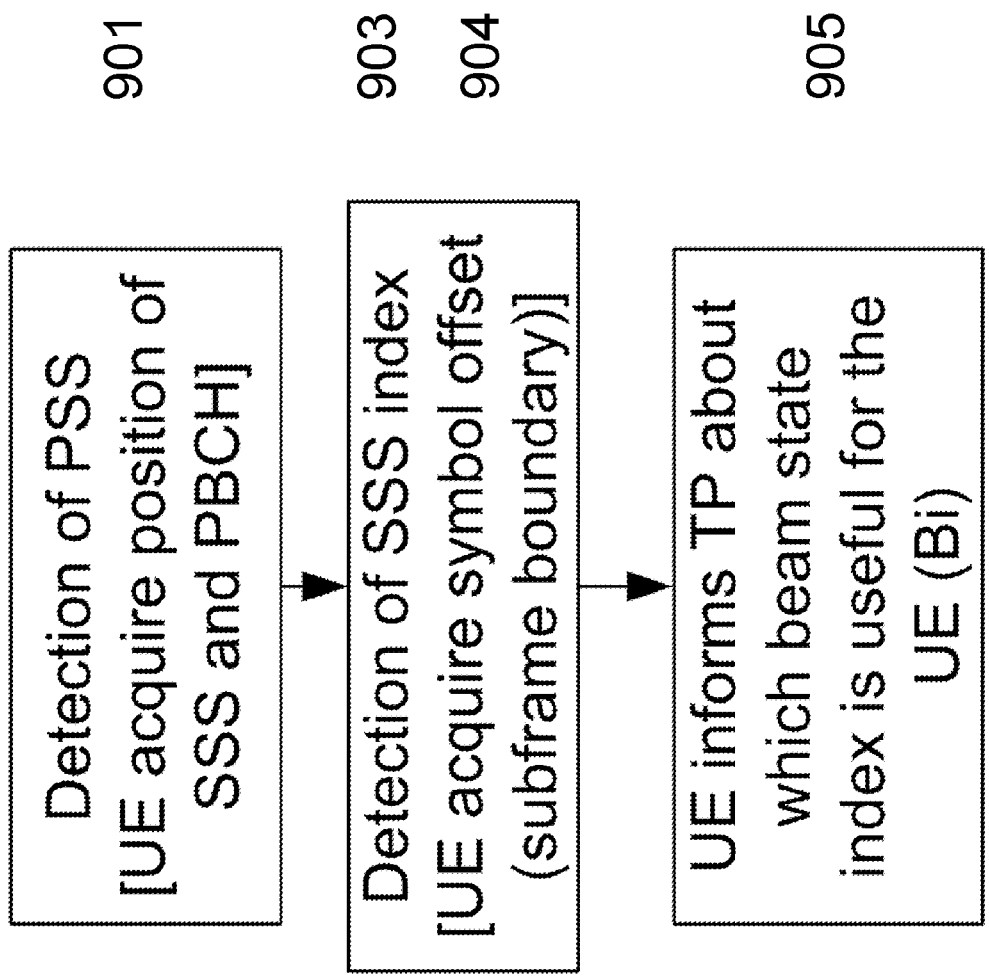
FIG. 10 is a flowchart illustrating an exemplary embodiment of a method in a wireless device.

FIG. 10 depicts, a flowchart of an example of the method performed by the wireless device 250, according to some embodiments herein, and as just described in reference to FIG. 9. The numbers on the right side of the Figure indicate the correspondence to the actions described in FIG. 9. In the figure, the wireless device 250 is represented as "UE". In FIG. 10, subframe offset, as used herein, is represented as "symbol offset (subframe boundary)". In this particular example, the first synchronization signal is a PSS, the associated information message comprises a second synchronization signal, which is SSS and the PBCH, and the network node 210 has performed the sending utilizing beamforming. A beam is represented in the Figure as being identified by "Bi". AS shown, the UE acquires position of SSS and PBCH through detection of PSS; followed by UE acquiring symbol offset by detecting of SSS index; and the UE informs the TP or network node about which beam state index is useful for the UE (Bi).

Figure 11:
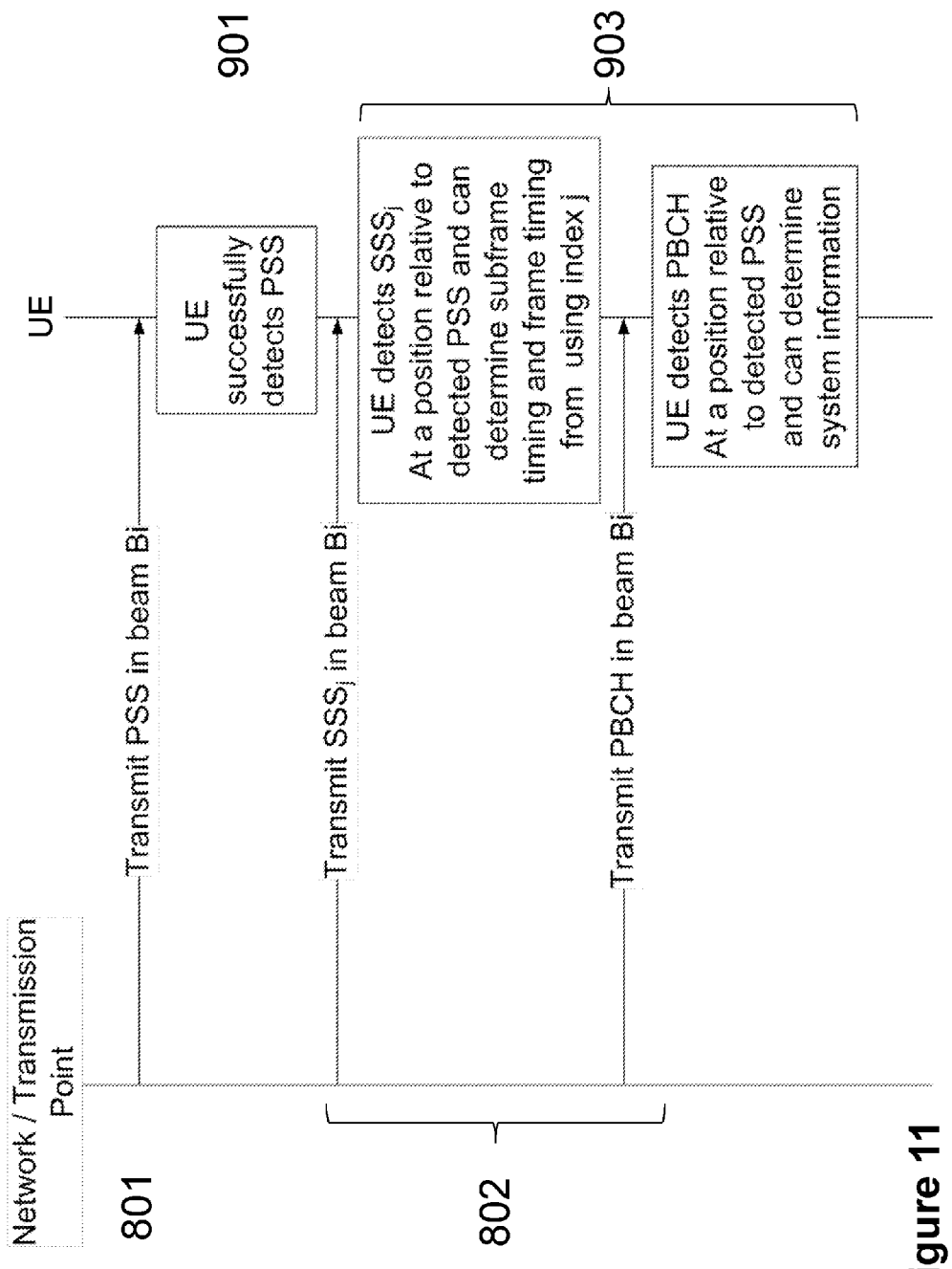
FIG. 11 is a schematic diagram illustrating an exemplary embodiment involving a network/TP or network node and a UE.
Figure 12:
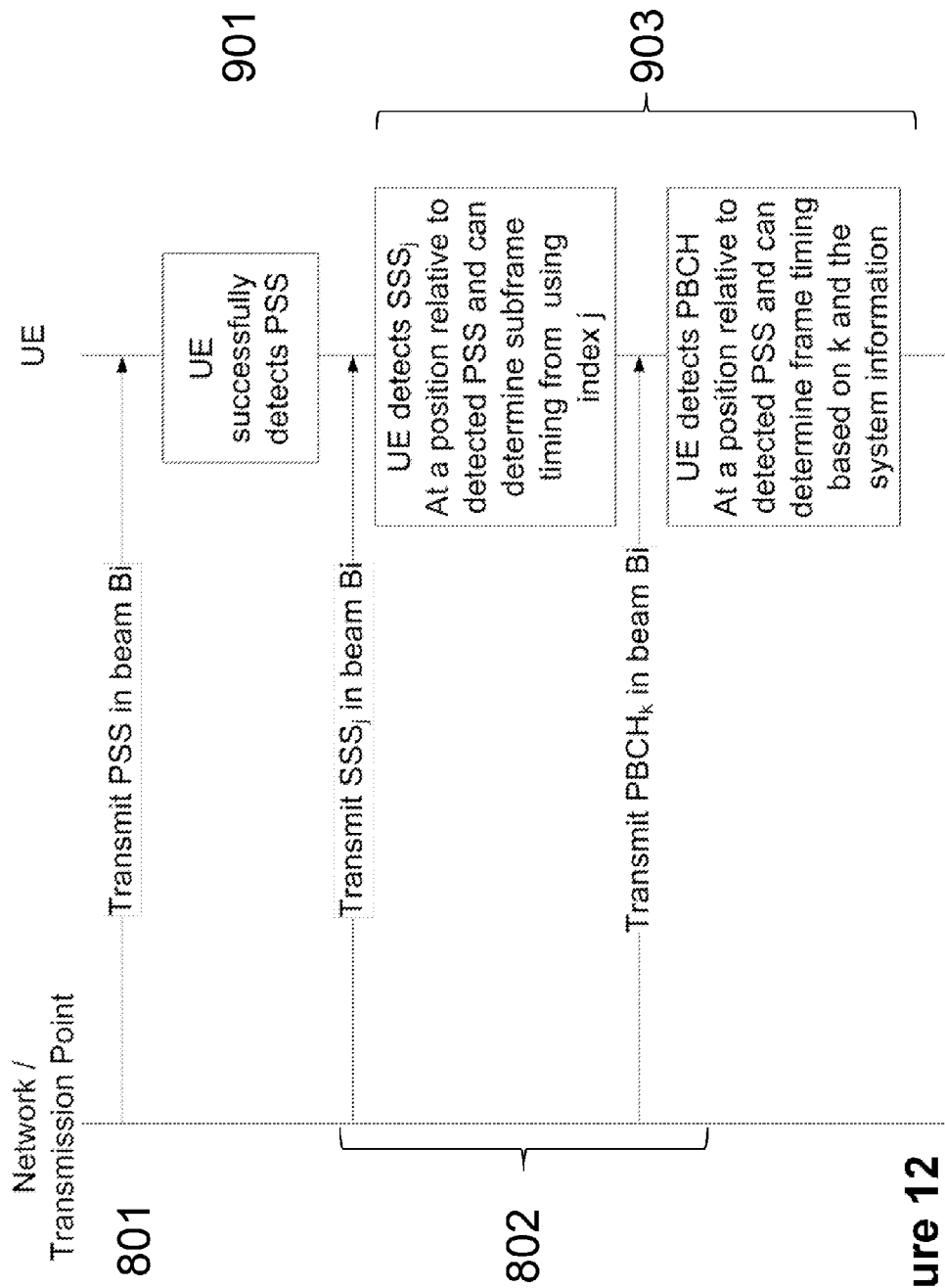
FIG. 12 is a schematic diagram illustrating another exemplary embodiment involving a network/TP or network node and a UE.

FIG. 11 and FIG. 12 depict schematic diagrams of at least part of methods in the network node 210 and the wireless device 250, according to some embodiments herein, and as just described in reference to some actions in FIGS. 8 and 9, respectively. The numbers on the left and right side of the Figure indicate the correspondence to the actions described in FIGS. 8 and 9, respectively.

In both figures, the network node 210 or TP 210 is represented as "Network/Transmission Point", and the wireless device 250 is represented as "UE". Also in both figures, the index, which in this case is a sequence index, is represented as "index j".

FIG. 11 depicts a schematic diagram describing some actions of one of the embodiments described herein, where the SSS determines the subframe and frame timing. Note that the PSS, SSS and PBCH not necessarily need to be transmitted in the same OFDM symbol. Note also that in this embodiment, the wireless device 250 may accumulate PBCH across several OFDM symbols since the PBCH remains the same in each OFDM symbol. In the particular examples of FIGS. 11 and 12, the first synchronization signal is a PSS, the associated information message comprises a second synchronization signal, which is a SSS, and the PBCH, and the network node 210 has performed the sending utilizing beamforming. The beam state index is represented in both Figures as being identified by "Bi".

As shown, the TP transmits PSS in beam Bi. It is here assumed the UE successfully detects the PSS. The TP transmits SSSj in beam Bi which is detected by the UE at a position relative to the detected PSS. The UE can determine subframe timing and frame timing from using index j. the TP transmits PBCH in beam Bi which the UE detects at a position relative to the detected PSS and can determine system information.

FIG. 12 depicts a schematic diagram describing some actions of one of the embodiments described herein, where the SSS determines the subframe timing and the PBCH contains information used to determine frame timing. Note that the PSS, SSS and PBCH not necessarily need to be transmitted in the same OFDM symbol. In this figure, the index is represented as "index j" for the sequence index in the SSS, and it is represented as "k" for index in the PBCH. The difference between the example of FIG. 11 and the one in FIG. 12 is that different indices are used in FIG. 12 namely j for the SSS and k for the PBCH. Further, when the UE detects the PBCH at a position relative to detected PSS, the UE may determine frame timing based on (sequence) index k and the system information.

To perform the method actions described above in relation to FIGS. 8, 11 and 12, the network node 210 is configured to send, to the wireless device 250, the first synchronization signal and the associated information message, for synchronization of the wireless device 250 with the network node 210. The network node 210 comprises the following arrangement depicted in FIG. 13. As already mentioned, in some embodiments, the network node 210 may be configured to send utilizing beamforming.

The detailed description of some of the following corresponds to the same references provided above, in relation to the actions described for the network node 210, and will thus not be repeated here.

The network node 210 may be configured to send the first synchronization signal in N OFDM symbols within a subframe, at least once in a time and frequency position in every one of the N OFDM symbols.

This may be performed by a sending module 1301 in the network node 210.

In some embodiments, for each sending of the first synchronization signal, the network node 210 is further configured to send the associated information message at the pre-defined time and frequency position in an OFDM symbol. The pre-defined time and frequency position is relative to the time and frequency position of the first synchronization signal. The associated information message is associated with the first synchronization signal.

This may be also be performed by the sending module sending 1301.

The first synchronization signal may be a PSS.

In some embodiments, the associated information message comprises the associated second synchronization signal. The second synchronization signal may be a SSS.

In some embodiments, the associated information message comprises the associated PBCH.

In some embodiments, the network node 210 is further configured to use a different beam state in at least two of the N OFDM symbols.

This may be also be performed by the sending module sending 1301.

In some embodiments, the network node 210 is further configured to use a different beam state is used in each of the N OFDM symbols.

This may be also be performed by the sending module sending 1301.

In some embodiments, the network node 210 is further configured to send the first synchronization signal in a beam state, and to send the associated information message using the same beam state as the first synchronization signal associated with the associated information message.

This may be also be performed by the sending module sending 1301.

In some embodiments, the associated PBCH further comprises the associated system information.

In some embodiments, the associated information message is different in each OFDM symbol wherein the associated information message is configured to be sent by network node 210, the associated information message comprises the index, and the subframe timing is obtainable by the wireless device 250 by detecting the index.

In some embodiments, the associated information message is the same in each OFDM symbol wherein the associated information message is configured to be sent by the network node 210 within a subframe, the associated information message is different in each subframe wherein the associated information message is configured to be sent by the network node 210 within a transmitted frame, the associated information message comprises the index, and the frame timing is obtainable by the wireless device 250 by detecting the index.

In some embodiments, the associated information message comprises the associated SSS, the index is the sequence index, and the subframe timing is obtainable by the wireless device 250 by detecting the sequence index comprised in the associated SSS.

In some embodiments, the associated information message comprises the associated SSS, the index is the sequence index, and the frame timing is obtainable by the wireless device 250 by detecting the sequence index comprised in the associated SSS.

In some embodiments, the associated information message comprises the associated system information, and the frame timing is obtainable by the wireless device 250 by detecting the index comprised in the associated system information.

In some embodiments, the sequence index comprises the index representing a sequence out of the set of possible sequences.

In some embodiments, the N OFDM symbols are non-consecutive OFDM symbols.

Figure 13:
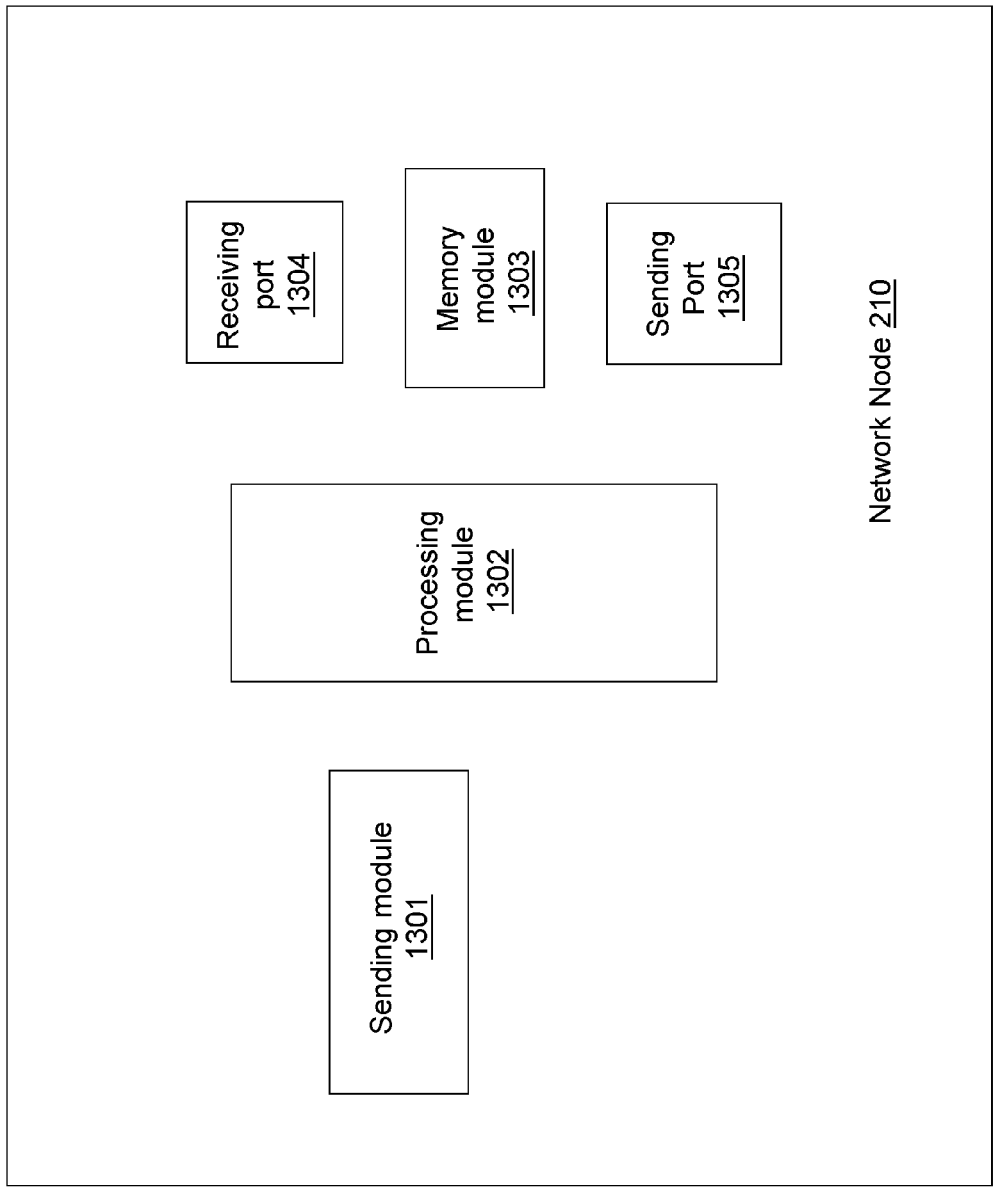
FIG. 13 is a block diagram of a exemplary network node according to some embodiments.

The embodiments herein for sending, e.g., utilizing beamforming, to the wireless device 250 the first synchronization signal and the associated information message, may be implemented through one or more processors, such as the processing module 1302 in the network node 210 depicted in FIG. 13, together with computer program code for performing the functions and actions of the embodiments herein. The program code mentioned above may also be provided as a computer program product, for instance in the form of a data carrier carrying computer program code for performing the embodiments herein when being loaded into the in the network node 210. One such carrier may be in the form of a CD ROM disc. It may be however feasible with other data carriers such as a memory stick. The computer program code may furthermore be provided as pure program code on a server and downloaded to the network node 210.

The network node 210 may further comprise a memory module 1303 comprising one or more memory units. The memory module 1303 may be arranged to be used to store data in relation to applications to perform the methods herein when being executed in the network node 210. Memory module 1303 may be in communication with the processing module 1302. Any of the other information processed by the processing module 1302 may also be stored in the memory module 1303.

In some embodiments, information may be received, for example, from the wireless device 250, through a receiving port 1304. In some embodiments, the receiving port 1304 may be, for example, connected to the one or more antennas in the network node 210. In other embodiments, the network node 210 may receive information from another structure in the wireless communications network 200 through the receiving port 1304. Since the receiving port 1304 may be in communication with the processing module 1302, the receiving port 1304 may then send the received information to the processing module 1302. The receiving port 1304 may also be configured to receive other information.

The information processed by the processing module 1302 in relation to the embodiments of method herein may be stored in the memory module 1303 which, as stated earlier, may be in communication with the processing module 1302 and the receiving port 1304.

The processing module 1302 may be further configured to transmit or send information to the wireless device 250 or another node in the wireless communications network 200, through a sending port 1305, which may be in communication with the processing module 1302, and the memory module 1303.

Those skilled in the art will also appreciate that the module 1301 described above may refer to a combination of analog and digital modules, and/or one or more processors configured with software and/or firmware, e.g., stored in memory, that, when executed by the one or more processors such as the processing module 1302, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, the methods according to the embodiments described herein for the network node 210 are respectively implemented by means of a computer program product, comprising instructions, i.e., software code portions, which, when executed on at least one processor, cause the at least one processor to carry out the actions described herein, as performed by the network node 210. The computer program product may be stored on a computer-readable storage medium. The computer-readable storage medium, having stored thereon the computer program, may comprise instructions which, when executed on at least one processor, cause the at least one processor to carry out the actions described herein, as performed by the network node 210. In some embodiments, the computer-readable storage medium may be a non-transitory computer-readable storage medium.

To perform the method actions described above in relation to FIGS. 9, 10, 11 and 12, the wireless device 250 is configured to detect the first synchronization signal and the associated information message configured to be sent by the network node 210, for synchronization of the wireless device 250 with the network node 210. The wireless device 250 comprises the following arrangement depicted in FIG. 14.

The wireless device 250 may be configured to detect the first synchronization signal. The first synchronization signal is configured to have been sent by the network node 210 in N OFDM symbols within a subframe, at least once in a time and frequency position in every one of the N OFDM symbols.

This may be performed by a detecting module 1401 in the wireless device 250.

In some embodiments, the wireless device 250 is further configured to detect the associated information message at the pre-defined time and frequency position. The pre-defined time and frequency position is relative to the time and frequency position of the detected first synchronization signal. The associated information message is associated with the first synchronization signal.

This may be also be performed by the detecting module 1401.

The first synchronization signal may be a PSS.

In some embodiments, the associated information message comprises the associated second synchronization signal. The second synchronization signal may be a SSS.

In some embodiments, to detect the associated information message comprises to match the sequence of the detected associated information message to the one of the set of possible information message sequences.

In some embodiments, the associated information message comprises the associated PBCH.

In some embodiments, the associated PBCH further comprises associated system information.

The associated information message comprises the index.

The wireless device 250 may be configured to obtain the subframe timing and/or the frame timing by detecting the index comprised in the associated information message.

This may be performed by an obtaining module 1402 and/or in the processing module 1405 in the wireless device 250.

In some embodiments, the associated information message is different in each OFDM symbol wherein the associated information message is configured to be sent by the network node 210, the associated information message comprises the index, and the wireless device 250 is further configured to obtain the subframe timing by detecting the index.

This may be also be performed by the obtaining module 1402 and/or in the processing module 1405.

In some embodiments, the associated information message is the same in each OFDM symbol wherein the associated information message is configured to be sent by the network node 210 within a subframe, the associated information message is different in each subframe wherein the associated information message is configured to be sent by the network node 210 within a transmitted frame, the associated information message comprises the index, and the wireless device 250 is further configured to obtain the frame timing by detecting the index.

This may be also be performed by the obtaining module 1402 and/or in the processing module 1405.

In some embodiments, the associated information message comprises the associated SSS, the index is the sequence index, and the wireless device 250 is further configured to obtain the frame timing by detecting the sequence index comprised in the associated SSS.

This may be also be performed by the obtaining module 1402 and/or in the processing module 1405.

In some embodiments, the associated information message comprises the associated system information, and the wireless device 250 is further configured to obtain the frame timing by detecting the index comprised in the associated system information.

This may be also be performed by the obtaining module 1402 and/or in the processing module 1405.

In some embodiments, the sequence index comprises the index representing the sequence out of the set of possible sequences.

In some embodiments, the wireless device 250 may be configured to discard detected OFDM symbols configured to be sent by the network node 210, wherein detection of the first synchronization signal in the discarded detected OFDM symbols is poor according to the threshold.

This may be performed by a discarding module 1403 in the wireless device 250.

In some embodiments, the wireless device 250 may be configured to send the message to the network node 210, the message comprising the information about which beam of the beams configured to be beamformed by the network node 210 to send the first synchronization signal and the associated information message was used by the wireless device 250 for synchronization.

This may be performed by a sending module 1404 in the wireless device 250.

Figure 14:
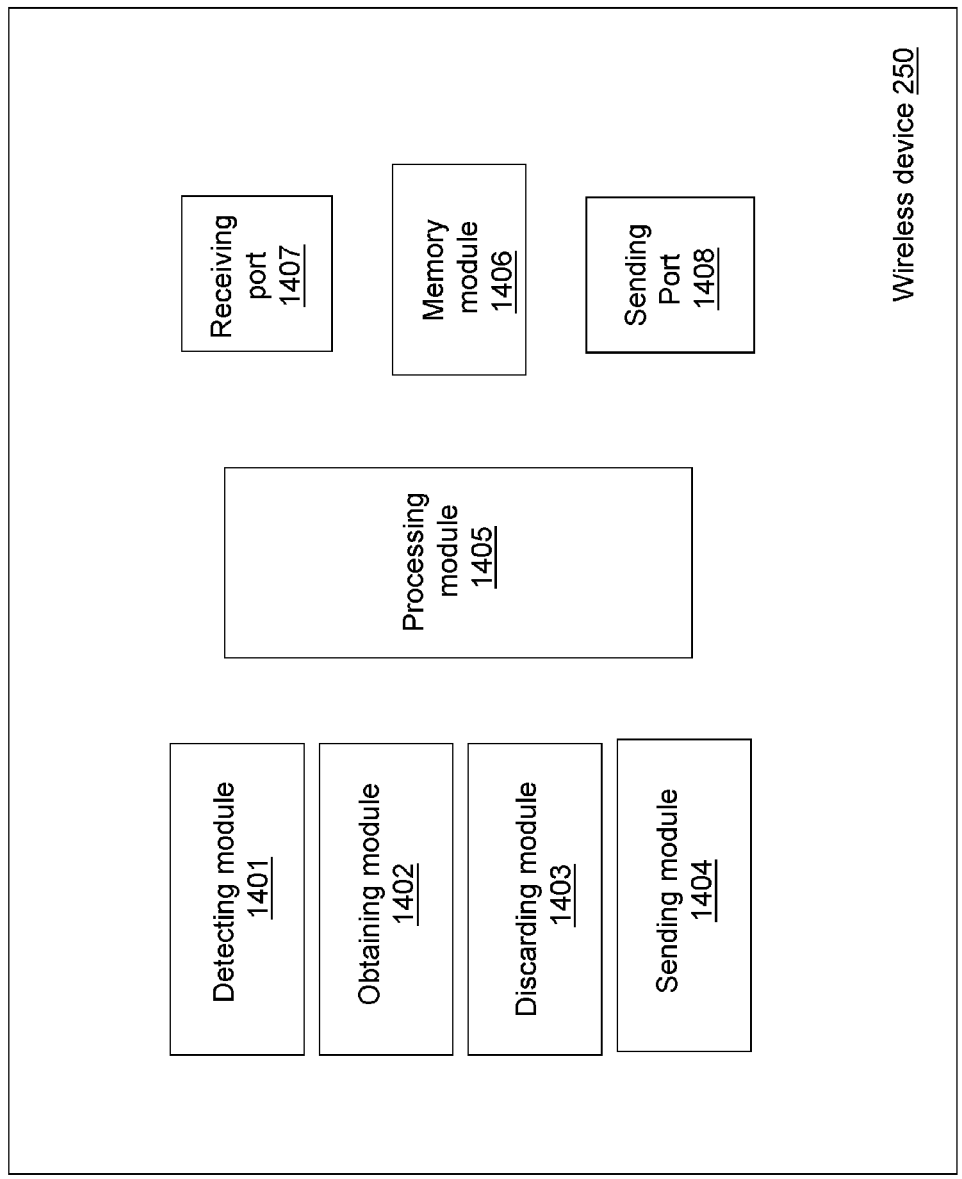
FIG. 14 is a block diagram of an exemplary wireless device according to some embodiments.

The embodiments herein for detecting the first synchronization signal and the associated information message sent by the network node 210 e.g., utilizing beamforming, for synchronization of the wireless device 250 with the network node 210 may be implemented through one or more processors, such as the processing module 1405 in the wireless device 250 depicted in FIG. 14, together with computer program code for performing the functions and actions of the embodiments herein. The program code mentioned above may also be provided as a computer program product, for instance in the form of a data carrier carrying computer program code for performing the embodiments herein when being loaded into the in the wireless device 250. One such carrier may be in the form of a CD ROM disc. It may be however feasible with other data carriers such as a memory stick. The computer program code may furthermore be provided as pure program code on a server and downloaded to the wireless device 250.

The wireless device 250 may further comprise a memory module 1406 comprising one or more memory units. The memory module 1406 may be arranged to be used to store data in relation to applications to perform the methods herein when being executed in the wireless device 250. Memory module 1406 may be in communication with the processing module 1405. Any of the other information processed by the processing module 1405 may also be stored in the memory module 1406.

In some embodiments, information may be received from, for example the network node 210, through a receiving port 1407. In some embodiments, the receiving port 1407 may be, for example, connected to the one or more antennas in the wireless device 250. In other embodiments, the wireless device 250 may receive information from another structure in the wireless communications network 200 through the receiving port 1407. Since the receiving port 1407 may be in communication with the processing module 1405, the receiving port 1407 may then send the received information to the processing module 1405. The receiving port 1407 may also be configured to receive other information.

The information processed by the processing module 1405 in relation to the embodiments of method herein may be stored in the memory module 1406 which, as stated earlier, may be in communication with the processing module 1405 and the receiving port 1407.

The processing module 1405 may be further configured to transmit or send information to the network node 210, through a sending port 1408, which may be in communication with the processing module 1405, and the memory module 1406.

Those skilled in the art will also appreciate that the different modules 1401-1404 described above may refer to a combination of analog and digital modules, and/or one or more processors configured with software and/or firmware, e.g., stored in memory, that, when executed by the one or more processors such as the processing module 1405, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, the methods according to the embodiments described herein for the wireless device 250 are respectively implemented by means of a computer program product, comprising instructions, i.e., software code portions, which, when executed on at least one processor, cause the at least one processor to carry out the actions described herein, as performed by the wireless device 250. The computer program product may be stored on a computer-readable storage medium. The computer-readable storage medium, having stored thereon the computer program, may comprise instructions which, when executed on at least one processor, cause the at least one processor to carry out the actions described herein, as performed by the wireless device 250. In some embodiments, the computer-readable storage medium may be a non-transitory computer-readable storage medium.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method, performed by a network node, for sending to a wireless device a first synchronization signal and an associated information message, for synchronization of the wireless device with the network node, the method comprising:
    sending the first synchronization signal in N Orthogonal Frequency-Division Multiplexing (OFDM) symbols within a subframe, wherein N is all of the OFDM symbols in the subframe, or every other of the OFDM symbols in the subframe, at least once in a time and frequency position in every one of the N OFDM symbols; and
    for each sending of the first synchronization signal using a different beamforming state comprising a given setting of one or more of azimuth angle, horizontal angle, transmit power or polarization state, sending an associated information message at a predefined time and frequency position in an OFDM symbol, which predefined time and frequency position is relative to the time and frequency position of the first synchronization signal, wherein the first synchronization signal is a Primary Synchronization Signal and wherein the associated information message comprises an associated second synchronization signal being a Secondary Synchronization Signal,
    wherein by sending of the first synchronization signals and the associated information messages to the wireless device, the network node synchronizes the wireless device with the network node.

2. The method of claim 1, wherein the associated information message comprises an associated Physical Broadcast CHannel (PBCH), wherein the associated PBCH further comprises associated system information.

3. The method of claim 1, wherein the first synchronization signal is sent in a beam state, and wherein the associated information message is sent using the same beam state as the first synchronization signal.

4. The method of claim 1, wherein the associated information message comprises an index for allowing the wireless device to obtain subframe timing and/or frame timing.

5. The method of claim 4, wherein the associated information message comprises the associated Secondary Synchronization Signal, and wherein the index is a sequence index.

6. A method, performed by a wireless device, for detecting a first synchronization signal and an associated information message sent by a network node for synchronization of the wireless device with the network node, the method comprising:

detecting the first synchronization signal sent by the network node in N Orthogonal Frequency-Division Multiplexing (OFDM) symbols within a subframe, wherein N is all of the OFDM symbols in the subframe, or every other of the OFDM symbols in the subframe, at least once in a time and frequency position in every one of the N OFDM symbols, wherein the first synchronization signal is sent by the network node using a different beamforming state comprising a given setting of one or more of azimuth angle, horizontal angle, transmit power or polarization state;

detecting the associated information message at a predefined time and frequency position, which predefined time and frequency position is relative to the time and frequency position of the detected first synchronization signal, wherein the first synchronization signal is a Primary Synchronization Signal, and wherein the detected associated information message comprises an associated second synchronization signal being a Secondary Synchronization Signal; and obtaining subframe timing and/or frame timing by detecting an index comprised in the associated information message to synchronize the wireless device with the network node.

7. The method of claim 6, wherein the detecting the associated information message comprises matching a sequence of the detected associated information message to one of a set of possible information message sequences.

8. The method of claim 6, wherein the associated information message comprises an associated Physical Broadcast CHannel (PBCH), wherein the associated PBCH further comprises associated system information.

9. The method of claim 6, wherein the index is a sequence index, and wherein the subframe timing is obtained by the wireless device by detecting the sequence index comprised in the associated information message.

10. A network node configured to send to a wireless device a first synchronization signal and an associated information message, for synchronization of the wireless device with the network node, the network node comprising:

a processor; and memory containing instructions executable by the processor whereby the network node is configured to:

send the first synchronization signal in N Orthogonal Frequency-Division Multiplexing (OFDM) symbols within a subframe, wherein N is all of the OFDM symbols in the subframe, or every other of the OFDM symbols in the subframe, at least once in a time and frequency position in every one of the N OFDM symbols; and for each sending of the first synchronization signal using a different beamforming state comprising a given setting of one or more of azimuth angle, horizontal angle, transmit power or polarization state, send an associated information message at a predefined time and frequency position in an OFDM symbol, which predefined time and frequency position is relative to the time and frequency position of the first synchronization signal, wherein the first synchronization signal is a Primary Synchronization Signal and wherein the associated information message comprises an associated second synchronization signal being a Secondary Synchronization Signal, wherein by sending of the first synchronization signals and the associated information messages to the wireless device, the network node synchronizes the wireless device with the network node.

11. The network node claim 10, wherein the associated information message comprises an associated Physical Broadcast CHannel (PBCH), wherein the associated PBCH further comprises associated system information.

12. The network node of claim 10, wherein the instructions are such that the network node is configured to:

send the first synchronization signal in a beam state; and send the associated information message using the same beam state as the first synchronization signal.

13. The network node of claim 10, wherein the associated information message comprises an index for allowing by the wireless device to obtain a subframe and/or frame timing.

14. The network node of claim 13, wherein the associated information message comprises the associated Secondary Synchronization Signal, and wherein the index is a sequence index.

15. A wireless device configured to detect a first synchronization signal and an associated information message configured to be sent by a network node, for synchronization of the wireless device with the network node, the wireless device comprising:

a processor; and memory containing instructions executable by the processor whereby the wireless device is configured to:

detect the first synchronization signal sent by the network node in N Orthogonal Frequency-Division Multiplexing (OFDM) symbols within a subframe, wherein N is all of the OFDM symbols in the subframe, or every other of the OFDM symbols in the subframe, at least once in a time and frequency position in every one of the N OFDM symbols, wherein the first synchronization signal is sent by the network node using a different beamforming state comprising a given setting of one or more of azimuth angle, horizontal angle, transmit power or polarization state;

detect the associated information message at a predefined time and frequency position, which predefined time and frequency position is relative to the time and frequency position of the detected first synchronization signal, wherein the first synchronization signal is a Primary Synchronization Signal, and wherein the detected associated information message comprises an associated second synchronization signal being a Secondary Synchronization Signal; and obtain subframe timing and/or frame timing by detecting an index comprised in the associated information message to synchronize the wireless device with the network node.

16. The wireless device of claim 15, wherein the instructions are such that the wireless device is configured to detect the associated information message by matching a sequence of the detected associated information message to one of a set of possible information message sequences.

17. The wireless device of claim 15, wherein the associated information message comprises an associated Physical Broadcast Channel (PBCH), wherein the associated PBCH further comprises associated system information.

18. The wireless device of claim 15, wherein the index is a sequence index, and wherein the instructions are such that the wireless device is configured to obtain the subframe timing by detecting the sequence index comprised in the associated information message.

19. A non-transitory computer readable medium comprising computer program product stored in a non transitory computer readable medium for controlling a network node for sending to a wireless device a first synchronization signal and an associated information message, for synchronization of the wireless device with the network node, the computer program product comprising software instructions which, when run on at least one processor of the network node, causes the network node to:
send the first synchronization signal in N Orthogonal Frequency-Division Multiplexing (OFDM) symbols within a subframe, wherein N is all of the OFDM symbols in the subframe, or every other of the OFDM symbols in the subframe, at least once in a time and frequency position in every one of the N OFDM symbols, wherein the first synchronization signal is sent by the network node using a different beamforming state comprising a given setting of one or more of azimuth angle, horizontal angle, transmit power or polarization state; and
for each sending of the first synchronization signal using a different beamforming state comprising a given setting of one or more of azimuth angle, horizontal angle, transmit power or polarization state, sending an associated information message at a predefined time and frequency position in an OFDM symbol, which predefined time and frequency position is relative to the time and frequency position of the first synchronization signal, wherein the first synchronization signal is a Primary Synchronization Signal and wherein the associated information message comprises an associated second synchronization signal being a Secondary Synchronization Signal,
wherein by sending of the first synchronization signals and the associated information messages to the wireless device, the network node synchronizes the wireless device with the network node.

20. A non-transitory computer readable medium comprising computer program product stored in a non transitory computer readable medium for controlling a wireless device, for detecting a first synchronization signal and an associated information message sent by a network node for synchronization of the wireless device with the network node, the computer program product comprising software instructions which, when run on at least one processor of the wireless device, causes the wireless device to:
detect the first synchronization signal sent by the network node in N Orthogonal Frequency-Division Multiplexing (OFDM) symbols within a subframe, wherein N is all of the OFDM symbols in the subframe, or every other of the OFDM symbols in the subframe, at least once in a time and frequency position in every one of the N OFDM symbols, wherein the first synchronization signal is sent by the network node using a different beamforming state comprising a given setting of one or more of azimuth angle, horizontal angle, transmit power or polarization state;
detect the associated information message at a predefined time and frequency position, which predefined time and frequency position is relative to the time and frequency position of the detected first synchronization signal, wherein the first synchronization signal is a Primary Synchronization Signal, and wherein the detected associated information message comprises an associated second synchronization signal being a Secondary Synchronization Signal; and
obtain subframe timing and/or frame timing by detecting an index comprised in the associated information message to synchronize the wireless device with the network node.

* * * * *